US010733810B2

(12) United States Patent
Gopalakrishnan et al.

(10) Patent No.: US 10,733,810 B2
(45) Date of Patent: Aug. 4, 2020

(54) METHOD AND SYSTEM FOR MANAGING PARKING VIOLATIONS BY VEHICLES IN PARKING AREAS IN REAL-TIME

(71) Applicant: Conduent Business Services, LLC, Dallas, TX (US)

(72) Inventors: Ragavendran Gopalakrishnan, Bangalore (IN); Arpita Biswas, Kolkata (IN); Partha Dutta, Bangalore (IN); Abhishek Tripathi, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 405 days.

(21) Appl. No.: 15/194,730

(22) Filed: Jun. 28, 2016

(65) Prior Publication Data
US 2017/0372529 A1    Dec. 28, 2017

(51) Int. Cl.
*G06Q 20/10*    (2012.01)
*G07B 15/02*    (2011.01)
(Continued)

(52) U.S. Cl.
CPC .............. *G07B 15/02* (2013.01); *G06Q 10/02* (2013.01); *G06Q 30/02* (2013.01); *G06Q 50/18* (2013.01); *G08G 1/14* (2013.01); *G08G 1/148* (2013.01)

(58) Field of Classification Search
CPC ...... G07B 15/02; G06Q 10/083; G06Q 50/18; G06Q 30/02; G06Q 10/02; G08G 1/14; G08G 1/148
(Continued)

(56) References Cited

U.S. PATENT DOCUMENTS 8,229,658 B1    7/2012 Dabell
8,688,509 B2    4/2014 Rowe et al.
(Continued)

FOREIGN PATENT DOCUMENTS

WO    WO 1998041953 A1    9/1998

OTHER PUBLICATIONS

A. Saha & G. Poole, The economics of crime and punishment: An analysis of optimal penalty, 2000, Economics Letters (Year: 2000).*
(Continued)

*Primary Examiner* — George Chen
*Assistant Examiner* — Wayne S. Murray
(74) *Attorney, Agent, or Firm* — Jones Robb, PLLC

(57) ABSTRACT

The disclosed embodiments illustrate methods and systems for managing parking violations by vehicles in parking areas in real-time. The method includes receiving parking information from one or more sensors installed at each of one or more parking spots in a plurality of parking areas at a specific time. The method includes detecting a parking violation by a vehicle at a parking spot of the one or more parking spots in a parking area. The method includes identifying one or more vehicle identification parameters of the vehicle associated with the detected parking violation. The method includes determining a penalty for the vehicle with the identified one or more vehicle identification parameters. The method includes transmitting the determined penalty to a user-computing device of a user associated with the vehicle with the identified one or more vehicle identification parameters, wherein the user is imposed with the penalty.

10 Claims, 6 Drawing Sheets

(51) Int. Cl.
*G06Q 50/18* (2012.01)
*G08G 1/14* (2006.01)
*G06Q 30/02* (2012.01)
*G06Q 10/02* (2012.01)

(58) Field of Classification Search
USPC .......................................................... 705/13
See application file for complete search history.

(56) References Cited

U.S. PATENT DOCUMENTS

| | | | |
|---|---|---|---|
| 9,026,347 B2 | 5/2015 | Gadh et al. | |
| 2003/0125981 A1* | 7/2003 | Pedrazzoli Pazos | G06Q 10/10 705/34 |
| 2009/0024430 A1* | 1/2009 | Marcus | G01C 21/3407 705/7.13 |
| 2009/0313104 A1 | 12/2009 | Hafner et al. | |
| 2011/0093314 A1* | 4/2011 | Redmann | G06Q 20/127 705/13 |
| 2011/0191265 A1 | 8/2011 | Lowenthal et al. | |
| 2012/0130872 A1* | 5/2012 | Baughman | G07B 15/02 705/32 |
| 2013/0173326 A1 | 7/2013 | Anglin et al. | |
| 2014/0046874 A1 | 2/2014 | Li et al. | |
| 2014/0089016 A1* | 3/2014 | Smullin | G06Q 10/02 705/5 |
| 2014/0214500 A1* | 7/2014 | Hudson | G06Q 30/0284 705/13 |
| 2014/0279818 A1 | 9/2014 | Jiang et al. | |
| 2015/0138362 A1* | 5/2015 | Stefik | G07B 15/02 348/148 |
| 2015/0298565 A1* | 10/2015 | Iwamura | B60L 11/1838 701/22 |
| 2016/0110928 A1* | 4/2016 | Bin Kenaid | G01S 19/13 705/13 |
| 2016/0264011 A1* | 9/2016 | Yasukawa | H04M 15/68 |
| 2017/0092017 A1* | 3/2017 | Zhou | G07B 15/02 |

OTHER PUBLICATIONS

W. Goodling & S. Olson, An Econometric Analysis of Parking Citation Payment in Eugene, Oregon, 2010, Department of Economics at the University of Oregon (Year: 2010).*

Mackowski, Daniel, Parking space management via dynamic performance-based pricing, Oct. 2015, Transportation Research Part C: Emerging Technologies, vol. 59, pp. 66-91 (Year: 2015).*

R Yusnita, Fariza Norbaya, and Norazwinawati Basharuddin. Intelligent parking space detection system based on image processing. International Journal of Innovation, Management and Technology, 3(3):232{235, 2012.

Amin Kianpisheh, Norlia Musta_a, Pakapan Limtrairut, and Pantea Keikhosrokiani. Smart Parking System (SPS) Architecture Using Ultrasonic Detector. International Journal of Software Engineering and Its Applications, 6(3):55{58, 2012.

Hoong Chuin Lau and Aldy Gunawan. The patrol scheduling problem. In Practice and Theory of Automated Timetabling, PATAT, 2012.

The vehicle routing problem: An overview of exact and approximate algorithms. European Journal of Operational Research, 59(3):345 {358, 1992, Gilbert Laporte.

* cited by examiner

METHOD AND SYSTEM FOR MANAGING PARKING VIOLATIONS BY VEHICLES IN PARKING AREAS IN REAL-TIME

TECHNICAL FIELD

The presently disclosed embodiments are related, in general, to a parking system. More particularly, the presently disclosed embodiments are related to methods and systems for managing parking violations by vehicles in parking areas in real-time.

BACKGROUND

Recent developments in the field of environment-friendly transportation mechanisms have led to the usage of electric vehicles (EVs) as one of the preferred modes of transportation. As the number of EVs on the roads is rapidly increasing, EV charging infrastructure in parking areas is also scaling up to meet the requirements of EV owners. Thus, parking areas include EV charging infrastructure in specific parking spots, such as "park-and-charge" spots for EVs, in addition to regular parking spots for EVs or non-EVs (for example, internal combustion engine (ICE) vehicles).

In certain scenarios, the available EV charging infrastructure in the parking areas may not be appropriately utilized, resulting in the violation of various types of parking regulations. For example, an EV may continue to be parked at a "park-and-charge" spot even after the EV is fully charged. In another example, the EV is simply parked at the "park-and-charge" spot without any intention of utilizing the charging infrastructure. In yet another example, a non-EV is parked at the "park-and-charge" spot thereby unnecessarily occupying the charging infrastructure.

For such violation of various types of parking regulations, the vehicle owners are levied considerable penalties, resulting in the generation of parking revenue, but reduction in the number of vehicle owners availing the parking facility. Therefore, an advanced mechanism may be desired to maintain a trade-off between higher generated parking revenue and the reduced likelihood of the vehicle owners accepting considerable penalties.

Further limitations and disadvantages of conventional and traditional approaches will become apparent to one of skill in the art, through a comparison of described systems with some aspects of the present disclosure, as set forth in the remainder of the present application and with reference to the drawings.

SUMMARY

According to embodiments illustrated herein, there is provided a method for managing parking violations by vehicles in parking areas in real-time. The method includes receiving, by one or more transceivers, parking information from one or more sensors installed at each of one or more parking spots in a plurality of parking areas at a specific time. The method further includes detecting, by one or more processors, a parking violation by a vehicle at a parking spot of the one or more parking spots in a parking area of the plurality of parking areas based on the received parking information and a set of pre-defined rules. The parking violation is associated with a first violation type or a second violation type. The method further includes identifying, by the one or more processors, one or more vehicle identification parameters of the vehicle associated with the detected parking violation. The method further includes determining, by the one or more processors, a penalty for the vehicle with the identified one or more vehicle identification parameters based on an adaptive penalty factor when the parking violation is of the first violation type, wherein the adaptive penalty factor is periodically updated based on at least an expected revenue and historical parking data associated with the plurality of parking areas. The method further includes transmitting, by the one or more transceivers, the determined penalty to a user-computing device of a user associated with the vehicle with the identified one or more vehicle identification parameters, wherein the user is imposed with the determined penalty.

According to embodiments illustrated herein, there is provided a system for managing parking violations by vehicles in parking areas in real-time. The system includes one or more processors configured to receive parking information from one or more sensors installed at each of one or more parking spots in a plurality of parking areas, at a specific time, by utilizing one or more transceivers. The one or more processors are further configured to detect a parking violation by a vehicle at a parking spot of the one or more parking spots in a parking area of the plurality of parking areas based on the received parking information and a set of pre-defined rules, wherein the parking violation is associated with a first violation type or a second violation type. The one or more processors are further configured to identify one or more vehicle identification parameters of the vehicle associated with the detected parking violation. The one or more processors are further configured to determine a penalty for the vehicle with the identified one or more vehicle identification parameters based on an adaptive penalty factor when the parking violation is of the first violation type. The adaptive penalty factor is periodically updated based on at least an expected revenue and historical parking data associated with the plurality of parking areas. The one or more processors are further configured to transmit the determined penalty to a user-computing device of a user associated with the vehicle with the identified one or more vehicle identification parameters by utilizing the one or more transceivers, wherein the user is imposed with the determined penalty.

According to embodiments illustrated herein, there is provided a computer program product for use with a computing device. The computer program product comprises a non-transitory computer readable medium storing a computer program code for managing parking violations by vehicles in parking areas in real-time. The computer program code is executable by one or more processors to receive parking information from one or more sensors installed at each of one or more parking spots in a plurality of parking areas, at a specific time, by utilizing one or more transceivers. The computer program code is further executable by one or more processors to detect a parking violation by a vehicle at a parking spot of the one or more parking spots in a parking area of the plurality of parking areas based on the received parking information and a set of pre-defined rules, wherein the parking violation is associated with a first violation type or a second violation type. The computer program code is further executable by one or more processors to identify one or more vehicle identification parameters of the vehicle associated with the detected parking violation. The computer program code is further executable by one or more processors to determine a penalty for the vehicle with the identified one or more vehicle identification parameters based on an adaptive penalty factor when the parking violation is of the first violation type. The adaptive penalty factor is periodically updated based on at least an expected revenue and historical parking data associated with the plurality of parking areas. The computer program code is further executable by one or more processors to transmit the determined penalty to a user-computing device of a user associated with the vehicle with the identified one or more vehicle identification parameters by utilizing the one or more transceivers, wherein the user is imposed with the determined penalty.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
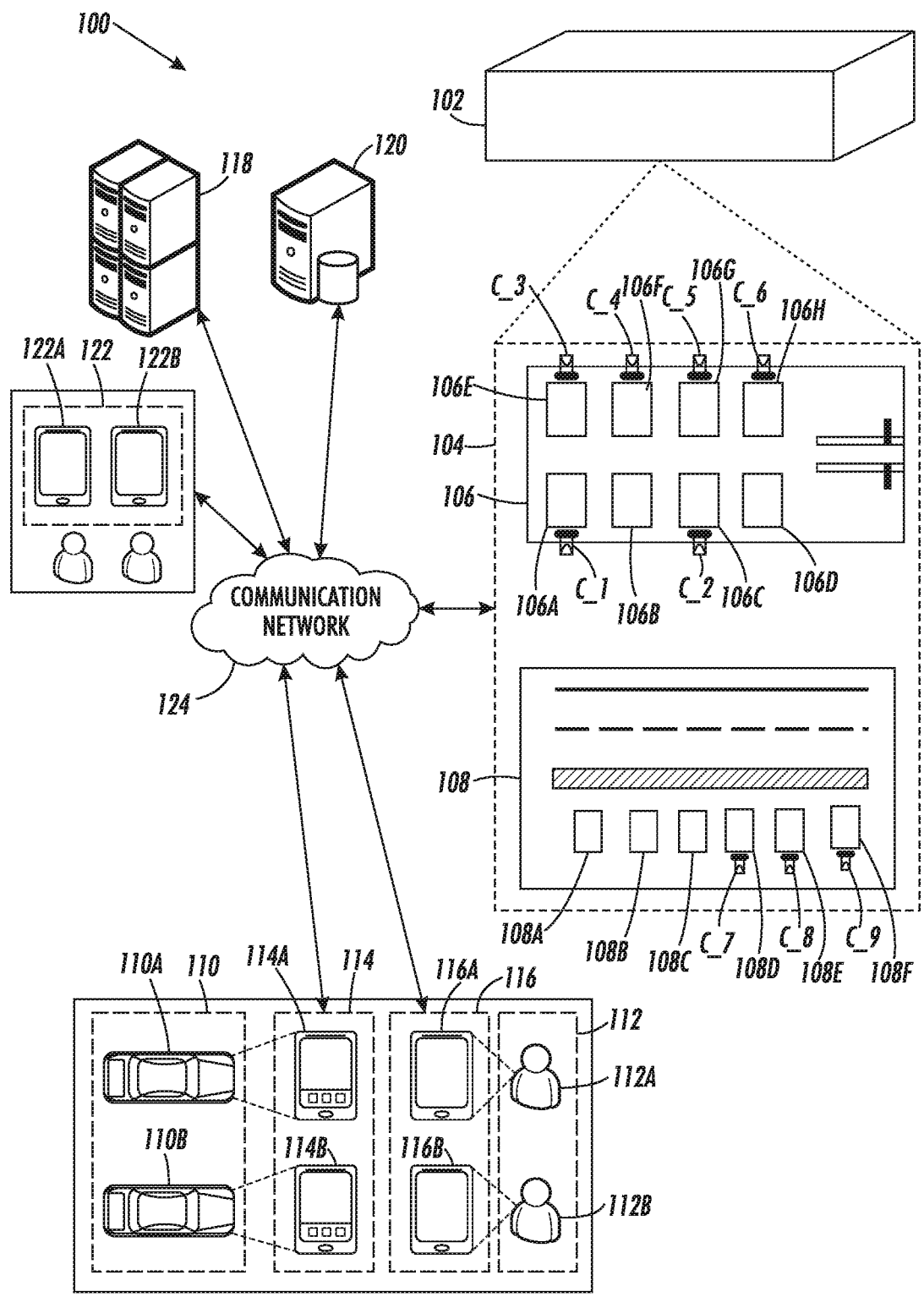
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "user-computing device" refers to a computer, a device (that includes one or more processors/microcontrollers and/or any other electronic components), or a system (that performs one or more operations according to one or more programming instructions/codes) associated with a user. In an embodiment, the user may utilize the user-computing device to transmit one or more requests to other computing devices, such as an application server. Examples of the user-computing device may include, but are not limited to, a desktop computer, a laptop, a personal digital assistant (PDA), a mobile device, a smartphone, and a tablet computer (for example, iPad® and Samsung Galaxy Tab®).

"Parking" refers to an act of driving a vehicle to a location where a user of the vehicle can stop and leave the vehicle. Further, the vehicle may remain at the location for a specific time period. The time period may depend on at least one or more activities of the user while the user is away from the vehicle.

"Parking violations" refer to a breach of parking regulations by one or more vehicles. In an embodiment, a parking violation may be detected based on a set of pre-defined rules. In other words, a vehicle not complying with the set of pre-defined rules may be associated with parking violations. In an embodiment, a parking violation may be associated with a first violation type or a second violation type.

A "plurality of parking areas" comprises areas where one or more vehicles may be parked. Each of the plurality of parking areas may include one or more parking spots where the one or more vehicles may be parked. Further, each of the plurality of parking areas may correspond to an off-street parking area or an on-street parking area. Further, each of the plurality of parking areas may be associated with one or more premises. The one or more premises may include one or more of: a house, sides of a road, multi-level structures, underground parking facilities, a business area, a shopping mall building, a grocery store building, airport, and/or the like.

"One or more vehicles" comprises various transportation means utilized by one or more users for travelling from one location to another. In an embodiment, each of the one or more vehicles may correspond to an EV or a non-EV. In an embodiment, the EVs correspond to chargeable vehicles. Further, the non-EVs correspond to ICE vehicles. In an embodiment, the EVs may utilize the charging facility available at EV parking spots in a plurality of parking areas.

"One or more parking spots" refer to one or more locations in a parking area where one or more users may park one or more vehicles. A parking spot in the one or more parking spots may correspond to an EV parking spot or a non-EV parking spot. Further, the EV parking spot may comprise a charging facility for an EV type. In an embodiment, the EV parking spot may be associated with the EV type. Further, a non-EV parking spot may be associated with the EV type and the non-EV type.

"Parking information" refers to information pertaining to one or more parking spots in a parking area. The parking information may comprise an occupancy status and a power drawn status of each of the one or more parking spots in the parking area. In an instance, an EV, parked at an EV parking spot, may utilize the available charging facility for charging the EV. In this scenario, the occupancy status of the EV parking spot may be "occupied" and the power drawn status of the EV parking spot may be "1."

A "set of pre-defined rules" comprises rules for parking one or more vehicles at one or more parking spots in a parking area. In an embodiment, a parking violation may be detected based on the set of pre-defined rules. Further, the set of pre-defined rules may comprise information pertaining to an association of a parking spot, a type of vehicle, and a violation time threshold. For example, a vehicle that breaches the set of pre-defined rules may be booked for a parking violation.

"First violation type" refers to a type of parking violation under which a vehicle of EV type may be booked. In an embodiment, penalty for the first violation type may be determined based on an adaptive penalty factor. In an embodiment, the first violation type may be detected when the power drawn status of a parking spot (i.e., an EV parking spot) changes from "1" to "0" and an occupancy status of the parking spot remains "occupied" for more than a violation time threshold.

"Second violation type" refers to a type of parking violation under which a vehicle of EV type or non-EV type may be booked. In an embodiment, penalty for the second violation type may be determined based on a fixed penalty factor. In an embodiment, the second violation type may be detected when the power drawn status of the parking spot (i.e., an EV parking spot) remains "0", and an occupancy status of the parking spot changes from "unoccupied" to "occupied" and remains "occupied" for more than a violation time threshold.

"One or more vehicle identification parameters" refer to one or more unique identifiers of a vehicle. In an embodiment, the vehicle may be identified based on the corresponding one or more vehicle identification parameters, such as a license plate number.

"Adaptive penalty factor" refers to a penalty factor that may be updated periodically. In an embodiment, a penalty for a parking violation associated with a first violation type may be determined based on the adaptive penalty factor. In an embodiment, the adaptive penalty factor may be updated based on expected revenue and historical parking data associated with a plurality of parking areas. In an embodiment, a period of update of the adaptive penalty factor may be pre-specified by a service provider.

"Expected revenue" refers to a revenue forecast associated with a plurality of parking areas. In an embodiment, the expected revenue is determined based on generated revenue in historical parking data. In an embodiment, an adaptive penalty factor may be updated based on the expected revenue.

"Historical parking data" refers to parking data associated with one or more previous days. In an embodiment, the historical parking data may comprise information pertaining to parking violations that were detected automatically or manually at a plurality of parking areas during the one or more previous days. Further, the historical parking data may comprise information pertaining to revenue generated from detected parking violations during the one or more previous days. In an embodiment, the historical parking data may be utilized to update an adaptive penalty factor and generate a patrolling schedule for one or more supervisors. In an embodiment, the historical parking data may be updated continuously.

"Patrolling schedule" refers to a schedule assigned to one or more parking supervisors for watching over a plurality of parking areas. Each of the one or more parking supervisors patrol a scheduled parking area of the plurality of parking areas based on the patrolling schedule. In an embodiment, the patrolling schedule may be generated based on a likelihood of occurrence of a parking violation and an aggregated value associated with the plurality of parking areas.

"One or more parking supervisors" refer to one or more individuals who are assigned a duty to watch over a plurality of parking areas. The one or more parking supervisors utilize one or more computing devices to provide manual feedback for parking violation detection. Further, the manual feedback from the one or more parking supervisors may be utilized to identify one or more vehicle identification parameters.

"Aggregated value" refers to an aggregate of revenue generated from a plurality of parking areas and a penalty amount received due to detected penalties in the plurality of parking areas. In an embodiment, the aggregated value may be determined based on historical parking data and the generated revenue. In an embodiment, the aggregated value may be utilized to generate a patrolling schedule of one or more parking supervisors.

"Travel cost" refers to a cost incurred by a parking supervisor in travelling among a plurality of parking areas. For example, if a parking supervisor travels from a first parking area to a second parking area, the price paid by the parking supervisor for travelling corresponds to the travel cost between the corresponding parking areas. In an embodiment, the travel cost may be a combination of costs due to travel time, as well as fuel and operating costs of a vehicle associated with the parking supervisor. In an embodiment, the travel cost may be utilized to generate a patrolling schedule of one or more parking supervisors for patrolling the plurality of parking areas.

FIG. 1 is a block diagram of a system environment in which various embodiments may be implemented. With reference to FIG. 1, there is shown a system environment 100 that includes a premise 102 associated with a plurality of parking areas 104, such as a first parking area 106 and a second parking area 108. In an embodiment, the first parking area 106 may comprise one or more parking spots 106A to 106H and the second parking area 108 may comprise one or more parking spots 108A to 108F. The system environment 100 further includes one or more vehicles 110 associated with one or more users 112. For an instance, a first vehicle 110A may be associated with a first user 112A and a second vehicle 110B may be associated with a second user 112B. In an embodiment, one or more vehicle-computing devices 114 may be installed in the one or more vehicles 110. For an instance, a first vehicle-computing device 114A may be installed in the first vehicle 110A and a second vehicle-computing device 114B may be installed in the second vehicle 110B. Further, each of the one or more users 112 may be associated with one or more user-computing devices 116. For an instance, the first user 112A may be associated with a first user-computing device 116A and the second user 112B may be associated with a second user-computing device 116B. The system environment 100 further includes an application server 118, a database server 120, one or more supervisor-computing devices 122, such as supervisor-computing devices 122A to 122B (associated with one or more parking supervisors), and a communication network 124. Various devices in the system environment 100 may be interconnected over the communication network 124. FIG. 1 shows, for simplicity, one premise, such as the premise 102, two parking areas, such as the first parking area 106 and the second parking area 108, two vehicles, such as the first vehicle 110A and the second vehicle 110B, two vehicle-computing devices, such as the first vehicle-computing device 114A and the second vehicle-computing device 114B, two user-computing devices, such as the first user-computing device 116A and the second user-computing device 116B, one application server, such as the application server 118, one database server, such as the database server 120, and two supervisor-computing devices, such as the supervisor-computing devices 122A to 122B. However, it will be apparent to a person having ordinary skill in the art that the disclosed embodiments may also be implemented using multiple premises, multiple parking areas, multiple vehicles, multiple vehicle-computing devices, multiple user-computing devices, multiple application servers, multiple database servers, and multiple supervisor-computing devices, without departing from the scope of the disclosure.

The premise 102 refers to a business area (indoor or outdoor) where the one or more users 112 may travel to perform one or more activities. For example, an individual may travel to a shopping mall, market, or a grocery store to sell or purchase one or more products/services. An employee may travel to his/her workplace to perform his/her professional work. An individual may travel to a city airport to board an airplane, receive one or more other individuals, and/or the like. A person having ordinary skill in the art will understand that the premise 102 is not limited to the business areas as mentioned in the above examples. The premise 102 may include a house, sides of a road, a multi-level building, and/or the like.

The premise 102 may be associated with the plurality of parking areas 104, such as the first parking area 106 and the second parking area 108. In an embodiment, a parking area in the plurality of parking areas 104 may correspond to an off-street parking area or an on-street parking area. For example, the first parking area 106 may correspond to the off-street parking area and the second parking area 108 may correspond to the on-street parking area. In an embodiment, the plurality of parking areas 104 may comprise one or more surveillance cameras for monitoring the plurality of parking areas 104. Further, the one or more surveillance cameras may be configured to transmit one or more images of the plurality of parking areas 104 to the application server 118. Further, each of the plurality of parking areas 104 may comprise one or more parking spots. For an instance, the first parking area 106 may comprise the one or more parking spots 106A to 106H and the second parking area 108 may comprise the one or more parking spots 108A to 108F. In an embodiment, the one or more parking spots 106A to 106H and 108A to 108F may be utilized to park the one or more vehicles 110, such as the first vehicle 110A and the second vehicle 110B.

In an embodiment, a parking spot in the one or more parking spots of a parking area may correspond to an EV parking spot or a non-EV parking spot. For example, the parking spot 106A in the first parking area 106 may correspond to the EV parking spot and the parking spot 106B in the first parking area 106 may correspond to the non-EV parking spot. Similarly, the parking spot 108E in the second parking area 108 may correspond to the EV parking spot and the parking spot 108C in the second parking area 108 may correspond to the non-EV parking spot. In an embodiment, the EV parking spot may be associated with an EV type. Further, a vehicle of the EV type, such as the first vehicle 110A, parked in the EV parking spot may utilize a charging facility, such as "C_1" to "C_9", to charge the vehicle for further use. Further, the non-EV parking spot may be associated with both a non-EV type and the EV type.

In an embodiment, each of the one or more parking spots in the plurality of parking areas 104 may be installed with one or more first sensors. Examples of the one or more first sensors may include, but are not limited to, ultrasonic sensors and wireless sensors. The one or more first sensors may be configured to determine an occupancy status of the one or more parking spots 106A to 106H and 108A to 108F. For example, if a parking spot, such as the parking spot 106A, is occupied by a vehicle, such as the first vehicle 110A, the occupancy status of the parking spot 106A, determined by the one or more first sensors, may be "occupied". Similarly, if the parking spot 106A is unoccupied, the occupancy status of the parking spot 106A, determined by the one or more first sensors, may be "vacant."

In an embodiment, a set of parking spots 106A, 106C, 106E to 106F, and 108D to 108F of the one or more parking spots 106A to 106H and 108A to 108F may correspond to the EV parking spot in the plurality of parking areas 104. The set of parking spots 106A, 106C, 106E to 106F, and 108D to 108F may be installed with one or more second sensors. Examples of the one or more second sensors may include, but are not limited to, current sensors, power sensors, and voltage sensors. The one or more second sensors may be configured to determine a power drawn status of the one or more EV parking spots 106A, 106C, 106E to 106F, and 108D to 108F. For example, if a vehicle, such as the first vehicle 110A, is charging at a parking spot, such as the EV parking spot 106A, the power drawn status of the parking spot 106A, determined by the one or more second sensors, may be "1." Similarly, if the first vehicle 110A is not charging at the EV parking spot 106A, the power drawn status of the parking spot, determined by the one or more second sensors, may be "0."

In an embodiment, the one or more first sensors and the one or more second sensors (i.e., collectively referred to as one or more sensors) may be configured to transmit parking information of the one or more parking spots 106A to 106H and 108A to 108F in the plurality of parking areas 104 to the application server 118 at a specific time. The parking information may comprise the occupancy status and the power drawn status of each of the one or more parking spots 106A to 106H and 108A to 108F in each of the plurality of parking areas 104.

The one or more vehicles 110 may be utilized by the one or more users 112 to reach the premise 102. After reaching the premise 102, the one or more users 112 may access the plurality of parking areas 104, associated with the premise 102, to park the one or more vehicles 110. In an embodiment, the one or more vehicles 110 may be associated with an EV type or the non-EV type. For example, the first vehicle 110A may be associated with the EV type and the second vehicle 110B may be associated with the non-EV type. In an embodiment, the one or more users 112 may be associated with the corresponding one or more vehicles 110 by offloading (e.g., by Bluetooth®) a unique International Mobile Station Equipment Identity (IMEI) number of the corresponding one or more user-computing devices 116 to the corresponding one or more vehicle-computing devices 114.

Each of the one or more vehicle-computing devices 114 refers to a computing device, installed in the corresponding one or more vehicles 110, which may be communicatively coupled to the communication network 124. Further, each of the one or more vehicle-computing devices 114 may include one or more processors and one or more memories. The one or more memories may include a computer readable code that may be executable by the one or more processors to perform one or more operations. In an embodiment, the one or more predetermined operations may include transmitting a current charging status of the corresponding vehicle of the EV type to the user-computing device of the corresponding user. For example, the first vehicle-computing device 114A may transmit the current charging status of the first vehicle 110A to the first user-computing device 116A of the first user 112A. Each of the one or more vehicle-computing devices 114 may correspond to a variety of computing devices, such as, but not limited to, a laptop, a PDA, a tablet computer, a smartphone, and a phablet.

Each of the one or more user-computing devices 116 may refer to a computing device (associated with a user of the one or more users 112) that may be communicatively coupled to the communication network 124. Each of the one or more user-computing devices 116, such as the first user-computing device 116A and the second user-computing device 116B, may comprise one or more processors and one or more memories. The one or more memories may include computer readable codes and instructions that may be executable by the one or more processors to perform one or more predetermined operations. The one or more predetermined operations may include presenting a current charging status of a vehicle of the EV type and a final parking cost to the corresponding user. Further, each of the one or more users 112 may have installed an application (e.g., a mobile app) on each of the corresponding one or more user-computing devices 116. For example, the first user 112A may have installed the application on the first user-computing device 116A. In an embodiment, each of the one or more users 112 may utilize the installed application to transmit one or more inputs (e.g., a request for a parking spot) to the application server 118. In an embodiment, each of the one or more user-computing devices 116 may be communicatively coupled with the corresponding one or more vehicle-computing devices 114 over the communication network 124.

Each of the one or more user-computing devices 116 may correspond to a variety of computing devices, such as, but not limited to, a laptop, a PDA, a Smartphone, and a phablet, and a tablet computer (e.g., iPad® and Samsung Galaxy Tab®).

The application server 118 refers to an electronic device, a computing device, or a software framework hosting an application or a software service that may be communicatively coupled to the communication network 124. In an embodiment, the application server 118 may be implemented to execute programs, routines, scripts, and/or the like, stored in one or more memories for supporting the hosted application or the software service. In an embodiment, the hosted application or the software service may be configured to perform one or more predetermined operations. In an embodiment, the one or more predetermined operations may include determining a penalty for a parking violation by the one or more vehicles 110 at the plurality of parking areas 104. In an embodiment, the parking violation by a vehicle may be associated with a first violation type or a second violation type.

In an embodiment, the application server 118 may be configured to receive the parking information from the one or more sensors installed at the one or more parking spots 106A to 106H and 108A to 108F in the plurality of parking areas 104 at a specific time. The parking information may comprise the occupancy status and the power drawn status associated with each of the one or more parking spots 106A to 106H and 108A to 108F in the plurality of parking areas 104. In an embodiment, the application server 118 may be configured to process the received parking information. Further, based on the processed parking information, the application server 118 may be configured to detect the parking violation by a vehicle of the one or more vehicles 110 at a parking spot in the one or more parking spots 106A to 106H and 108A to 108F at a parking area in the plurality of parking areas 104. Further, the application server 118 may utilize a set of pre-defined rules for the detection of the parking violation by a vehicle of the one or more vehicles 110. In an embodiment, the set of pre-defined rules may comprise information pertaining to an association of a parking spot and a type of vehicle, and a violation time threshold. In an embodiment, the application server 118 may query the database server 120 to retrieve the set of pre-defined rules for the detection of the parking violation. In an embodiment, the set of pre-defined rules may be pre-specified by a service provider.

After the detection of the parking violation, the application server 118 may be configured to identify one or more vehicle identification parameters, such as a license plate number, of the vehicle associated with the detected parking violation. In an embodiment, the application server 118 may utilize one or more image processing techniques, such as license plate recognition technique, known in the art for the identification of the one or more vehicle identification parameters. In another embodiment, the application server 118 may identify the one or more vehicle identification parameters based on a manual feedback received from a parking supervisor, of the one or more parking supervisors, associated with a supervisor-computing device of the one or more supervisor-computing devices 122. In an embodiment, the one or more parking supervisors may patrol the plurality of parking areas 104 based on a patrolling schedule.

In an embodiment, the application server 118 may be further configured to generate the patrolling schedule of the one or more parking supervisors for the plurality of parking areas 104. The application server 118 may generate the patrolling schedule based on at least a likelihood of occurrence of the parking violation, an aggregated value associated with the plurality of parking areas 104, and a travel cost among the plurality of parking areas 104. In an embodiment, the application server 118 may further determine the likelihood of occurrence of the parking violation based on historical parking data associated with each of the plurality of parking areas 104. In an embodiment, the application server 118 may be configured to determine the historical parking data to generate the patrolling schedule. Thereafter, the application server 118 may store the historical parking data in the database server 120. In an embodiment, the application server 118 may be further configured to update the historical parking data stored in the database server 120. In an embodiment, the application server 118 may be further configured to determine the aggregated value for the generation of the patrolling schedule based on the historical parking data and generated revenue associated with each of the plurality parking areas 104.

In an embodiment, the application server 118 may be further configured to determine the penalty for the vehicle with the identified one or more vehicle identification parameters. In an embodiment, when the parking violation is of the first violation type, the application server 118 may determine the penalty for the vehicle with the identified one or more vehicle identification parameters, based on an adaptive penalty factor. In an embodiment, the application server 118 may be configured to periodically update the adaptive penalty factor, based on at least expected revenue and the historical parking data associated with the plurality of parking areas 104. Further, the application server 118 may be configured to determine the expected revenue for updating the adaptive penalty factor. The application server 118 may be configured to utilize the historical parking data for the determination of the expected revenue and the update of the adaptive penalty factor. In another embodiment, when the parking violation is of the second violation type, the application server 118 may determine the penalty for the vehicle with the identified one or more vehicle identification parameters, based on a fixed penalty factor.

After the determination of the penalty, the application server 118 may be configured to transmit the determined penalty to a user-computing device of a user associated with the vehicle with the identified one or more vehicle identification parameters. Further, the user associated with the vehicle with the identified one or more vehicle identification parameters may be charged the determined penalty. In an instance, the vehicle associated with the identified one or more vehicle identification parameters may correspond to the first vehicle 110A. In such a case, the application server 118 may transmit the determined penalty to the first user-computing device 116A of the first user 112A. Thereafter, the first user 112A may be charged the determined penalty.

In an embodiment, the final parking cost determined by the application server 118 may include regular parking cost and/or the determined penalty. In an embodiment, the regular parking cost may correspond to a parking cost when parking violation is not detected.

The database server 120 refers to a computing device that may be communicatively coupled to the communication network 124. In an embodiment, the database server 120 may be configured to store the historical parking data and information pertaining to revenue generated from the plurality of parking areas 104. In an embodiment, the database server 120 may receive a query from the application server 118 to retrieve the historical parking data and the information pertaining to revenue generated from the plurality of parking areas 104. In an embodiment, the database server 120 may further store the set of pre-defined rules for the detection of parking violation. For querying the database server 120, one or more querying languages may be utilized such as, but not limited to, SQL, QUEL, DMX, and so forth. Further, the database server 120 may be realized through various technologies such as, but not limited to, Microsoft® SQL server, Oracle®, and My SQL®. In an embodiment, the database server 120 may connect to the application server 118, using one or more protocols such as, but not limited to, Open Database Connectivity (ODBC) and Java Database Connectivity (JDBC).

A person having ordinary skill in the art will understand that the scope of the disclosure is not limited to realizing the database server 120 and the application server 118 as separate entities. In another embodiment, the functionalities of the database server 120 may be implemented within the application server 118.

Each of the one or more supervisor-computing devices 122 refers to a computing device associated with a parking supervisor of the one or more parking supervisors. Further, each of the one or more supervisor-computing devices 122 may comprise one or more processors and one or more memories. The one or more memories may include computer readable codes and instructions that may be executable by the one or more processors to perform one or more predetermined operations. In an embodiment, the one or more predetermined operation may include presenting the patrolling schedule, received from the application server 118, to the corresponding parking supervisor. In an embodiment, each of the one or more supervisor-computing devices 122 may be utilized by the corresponding parking supervisor to transmit the manual feedback comprising the one or more vehicle identification parameters of the vehicle associated with the detected parking violation.

Each of the one or more supervisor-computing devices 122 may correspond to a variety of computing devices such as, but are not limited to, a laptop, a PDA, a tablet computer, a Smartphone, and a phablet.

The communication network 124 corresponds to a medium through which content and messages flow between various devices, such as the one or more user-computing devices 114, the one or more vehicle-computing devices 114, the application server 118, the database server 120, and the one or more supervisor-computing devices 122, of the system environment 100. Examples of the communication network 124 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 124 in accordance with various wired and wireless communication protocols such as Transmission Control Protocol and Internet Protocol (TCP/IP), User Datagram Protocol (UDP), and 2G, 3G, or 4G communication protocols.

Figure 2:
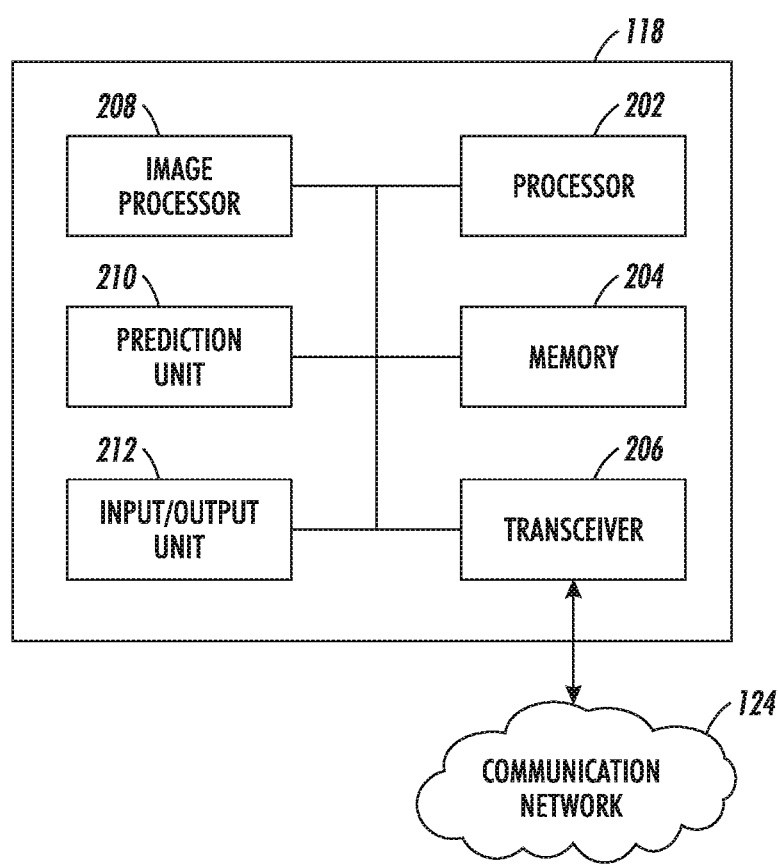
FIG. 2 is a block diagram that illustrates an application server, in accordance with at least one embodiment.

FIG. 2 is a block diagram that illustrates an application server, in accordance with at least one embodiment. FIG. 2 has been described in conjunction with FIG. 1. With reference to FIG. 2, there is shown the application server 118 that may include a processor 202, a memory 204, a transceiver 206, an image processor 208, a prediction unit 210, and an input/output unit 212. The processor 202 is communicatively coupled to the memory 204, the transceiver 206, the image processor 208, the prediction unit 210, and the input/output unit 212.

The processor 202 includes suitable logic, circuitry, and/or interfaces that are configured to execute one or more instructions stored in the memory 204. The processor 202 may further comprise an arithmetic logic unit (ALU) (not shown) and a control unit (not shown). The ALU may be coupled to the control unit. The ALU may be configured to perform one or more mathematical and logical operations and the control unit may control the operations of the ALU. The processor 202 may execute a set of instructions/programs/codes/scripts stored in the memory 204 to perform one or more operations for managing parking violations by the one or more vehicles 110 in the plurality of parking areas 104 in real-time. In an embodiment, the processor 202 may be configured to detect the parking violation in the plurality of parking areas 104. In an embodiment, the processor 202 may be further configured to generate the patrolling schedule for the one or more parking supervisors associated with the one or more supervisor-computing devices 122. In an embodiment, the processor 202 may be further configured to determine the historical parking data. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions that are executable by the processor 202, the transceiver 206, the image processor 208, the prediction unit 210, and the input/output unit 212. In an embodiment, the memory 204 may include one or more buffers (not shown). The one or more buffers may store the updated adaptive penalty factor and the fixed penalty factor. Some of the commonly known memory implementations may include, but are not limited to, a random access memory (RAM), a read only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 may enable the hardware of the application server 118 to perform the predetermined operations, without deviating from the scope of the disclosure.

The transceiver 206 transmits/receives messages and data to/from various components, such as the one or more sensors, the one or more surveillance cameras, the one or more vehicle-computing devices 114, the one or more user-computing devices 116, the database server 120, and the one or more supervisor-computing devices 122 of the system environment 100 over the communication network 124. In an embodiment, the transceiver 206 may be communicatively coupled to the communication network 124. In an embodiment, the transceiver 206 may be configured to receive the parking information from the one or more sensors at a specific time, over the communication network 124. In an embodiment, the transceiver 206 may be further configured to receive the one or more images of the one or more parking spots 106A to 106H and 108A to 108F in each of the plurality of parking areas 104 from the one or more surveillance cameras. Further, the transceiver 206 may be configured to transmit one or more notifications to the one or more user-computing devices 116, the one or more supervisor-computing devices 122, and an agent-computing device (associated with the service provider of the plurality of parking areas 104). Examples of the transceiver 206 may include, but are not limited to, an antenna, an Ethernet port, a Universal Serial Bus (USB) port, or any other port that can be configured to receive and transmit data. The transceiver 206 receives and transmits the content/information/notifications, in accordance with the various communication protocols, such as TCP/IP, UDP, and 2G, 3G, or 4G communication protocols.

The image processor 208 may comprise suitable logic, circuitry, interfaces and/or code that may be configured to execute the one or more instructions stored in the memory 204 for the detection of a parking violation and the identification of the one or more vehicle identification parameters. In an embodiment, the image processor 208 may be configured to process the one or more images received from the one or more surveillance cameras in the plurality of parking areas 104 to detect the parking violation. Further, the image processor 208 may be configured to identify the one or more vehicle identification parameters, such as the license plate number, of the vehicle associated with the parking violation based on the one or more processed images. In an embodiment, the image processor 208 may utilize the one or more image processing algorithms, such as the license plate recognition technique, to identify the one or more vehicle identification parameters of the vehicle associated with the detected parking violation. The image processor 208 may be implemented using one or more processor technologies known in the art. Examples of the image processor 208 may include, but are not limited to, an X86, a RISC processor, a CISC processor, or any other processor. In another embodiment, the image processor 208 may be implemented as an Application-Specific Integrated Circuit (ASIC) microchip designed for a special application, such as processing the one or more images.

The prediction unit 210 may comprise suitable logic, circuitry, interfaces and/or code that may be configured to execute the one or more instructions stored in the memory 204 to determine the expected revenue and the periodic update of the adaptive penalty factor based on the historical parking data. The prediction unit 210 may be implemented based on a number of processor technologies known in the art. Examples of the prediction unit 210 may include, but are not limited to, an X86-based processor, a RISC processor, and/or a CISC processor. In another embodiment, the prediction unit 210 may be implemented as an ASIC microchip designed for a special application, such as processing the historical parking data to determine the expected revenue and the periodic update of the adaptive penalty factor.

A person having ordinary skill in the art will understand the scope of the disclosure is not limited to realizing the prediction unit 210 and the processor 202 as separate entities. In another embodiment, the functionalities of the prediction unit 210 may be implemented within the processor 202.

The input/output unit 212 may comprise suitable logic, circuitry, interfaces, and/or code that may be configured to provide an output to the user and/or the service provider. The input/output unit 212 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

Figure 3:
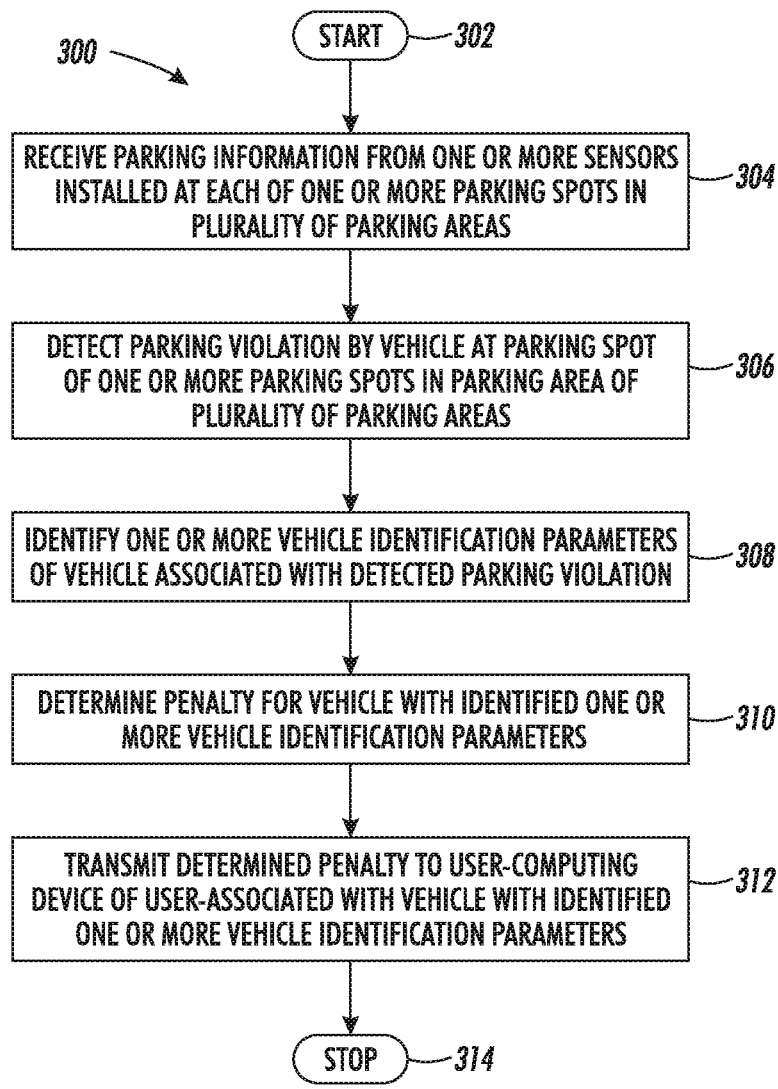
FIG. 3 is a flowchart that illustrates a method for managing parking violations by vehicles in parking areas in real-time, in accordance with at least one embodiment.

FIG. 3 is a flowchart that illustrates a method for managing parking violations by vehicles in parking areas in real-time, in accordance with at least one embodiment. FIG. 3 is described in conjunction with FIG. 1 and FIG. 2. With reference to FIG. 3, there is shown a flowchart 300 that illustrates a method for managing parking violations by vehicles in parking areas in real-time. The method starts at step 302 and proceeds to step 304.

At step 304, the parking information is received from the one or more sensors installed at each of the one or more parking spots 106A to 106H and 108A to 108F, in the plurality of parking areas 104, at a specific time. In an embodiment, the transceiver 206, in conjunction with the processor 202, may be configured to receive the parking information, at a specific time, from the one or more sensors installed at each of the one or more parking spots 106A to 106H and 108A to 108F in the plurality of parking areas 104. In an embodiment, the one or more sensors may include the one or more first sensors and the one or more second sensors installed at each of the plurality of parking areas 104, such as the first parking area 106 and the second parking area 108.

In an embodiment, the parking information may comprise the occupancy status of each of the one or more parking spots 106A to 106H and 108A to 108F, i.e., the EV parking spots and the non-EV parking spots, in each of the plurality of parking areas 104, such as the first parking area 106 and the second parking area 108. In an embodiment, the parking information may further comprise the power drawn status of the occupied one or more EV parking spots 106A, 106C, 106E to 106H, and 108D to 108F. In an embodiment, the parking information may further comprise the one or more images, transmitted by the one or more surveillance cameras installed at the one or more parking spots 106A to 106H and 108A to 108F in each of the plurality of parking areas 104. In an embodiment, the image processor 208 may be further configured to process the received images to determine the occupancy status of the one or more parking spots 106A to 106H and 108A to 108F.

In an exemplary scenario, the first user 112A may park the first vehicle 110A that is of EV type at an EV parking spot, such as the parking spot 106A. The first user 112A may avail the charging facility "C_1" at the EV parking spot. Thus, the parking information, received from the one or more sensors, pertaining to the parking spot 106A may comprise the occupancy status "occupied" and the power drawn status "1." After the first vehicle 110A is fully charged, the power drawn status in the parking information, received from the one or more sensors, may change from "1" to "0." Further, after complete charging, the first user may move the first vehicle 110A to a non-EV parking spot, such as parking spot 106B. In this scenario, the occupancy status in the parking information of the parking spot 106A changes from "occupied" to "vacant" and the occupancy status in the parking information of the parking spot 106B changes from "vacant" to "occupied."

A person having ordinary skill in the art will understand that the scope of the disclosure is not limited to the reception of the parking information from the one or more sensors or the one or more surveillance cameras. In another embodiment, a parking supervisor of the one or more parking supervisors patrolling a parking area may utilize a supervisor-computing device to provide the parking information pertaining to the one or more parking spots in the parking area.

At step 306, the parking violation by a vehicle at a parking spot of the one or more parking spots 106A to 106H and 108A to 108F in a parking area of the plurality of parking areas 104 is detected. In an embodiment, the processor 202, in conjunction with the image processor 208, may be configured to detect the parking violation by the vehicle at the parking spot of the one or more parking spots 106A to 106H and 108A to 108F in the parking area of the plurality of parking areas 104 based on the received parking information. The detected parking violation may be associated with the first violation type or the second violation type.

In an embodiment, the processor 202 may further detect the parking violation based on the set of pre-defined rules. In an embodiment, the set of pre-defined rules may comprise at least the information pertaining to the association of a parking spot and a type of vehicle, and the violation time threshold. In an embodiment, the EV parking spot may be associated with the EV type and the non-EV parking spot may be associated with the non-EV type and the EV type. Further, the processor 202, in conjunction with the image processor 208, may process the received parking information to detect the parking violation.

Based on the processed parking information, the processor 202 may be configured to check whether the set of pre-defined rules are met by the one or more vehicles 110 parked at the one or more parking spots 106A to 106H and 108A to 108F in the plurality of parking areas 104. In an embodiment, if the set of pre-defined rules is breached by a vehicle parked at a parking spot, the processor 202 may detect the parking violation for the vehicle.

In an exemplary scenario, based on the occupancy status in the parking information, the processor 202 may determine that an EV type, such as the first vehicle 110A, is parked at an EV parking spot, such as the parking spot 106A. Further, based on the parking information, the processor 202 may determine that the power drawn status of the parking spot 106A has changed from "1" to "0." However, after the change of the power drawn status, the occupancy status of the parking spot 106A continues to be "occupied" for more than the violation time threshold, such as "5 minutes." In this scenario, the processor 202 may detect a breach of the set of pre-defined rules. Thus, a parking violation by the first vehicle 110A may be detected by the processor 202. Further, in this scenario, the parking violation may be associated with the first violation type.

In another exemplary scenario, based on the occupancy status in the parking information, the processor 202 may determine that an EV type, such as the first vehicle 110A, is parked at an EV parking spot, such as the parking spot 106A. Further, based on the parking information, the processor 202 may determine that after the change of the occupancy status of the parking spot 106A, the power drawn status of the parking spot 106A remains "0" for more than the violation time threshold, such as "5 minutes." In this scenario, the processor 202 may detect a breach of the set of pre-defined rules. Thus, a parking violation by the first vehicle 110A may be detected by the processor 202. In this scenario, the parking violation may be associated with the second violation type.

In yet another exemplary scenario, based on the occupancy status in the parking information, the processor 202 may determine that a non-EV type, such as the second vehicle 110B, is parked at an EV parking spot, such as the parking spot 106A. Further, based on the parking information, the processor 202 may determine that after the change of the occupancy status of the parking spot 106A, the power drawn status of the parking spot 106A remains "0" for more than the violation time threshold, such as "5 minutes." In this scenario, the processor 202 may detect a breach of the set of pre-defined rules. Thus, a parking violation by the second vehicle 110B may be detected by the processor 202. In this scenario, the parking violation may be associated with the second violation type.

A person having ordinary skill in the art will understand that the abovementioned exemplary scenarios are for illustrative purpose and should not be construed to limit the scope of the disclosure.

At step 308, the one or more vehicle identification parameters of the vehicle associated with the detected parking violation are identified. In an embodiment, the image processor 208, in conjunction with the processor 202, may be configured to identify the one or more vehicle identification parameters. In an embodiment, the image processor 208 may utilize the one or more images of the parking spot associated with the detected parking violation for the identification of the one or more vehicle identification parameters.

In an embodiment, the image processor 208 may utilize the one or more image processing techniques known in the art for the identification of the one or more vehicle identification parameters of the vehicle associated with the detected parking violation. Examples of the image processing techniques may include, but are not limited to, image recognition techniques and license plate recognition technique.

In an exemplary scenario, after the detection of the parking violation, the image processor 208 may process the one or more images received from the one or more surveillance cameras installed at the one or more parking spots 106A to 106H and 108A to 108F. Thereafter, the image processor 208 may identify the image, from the one or more images, of the parking spot associated with the detected parking violation. Thereafter, the image processor 208 may identify the license plate number (i.e., the one or more vehicle identification parameters) of the vehicle associated with detected parking violation from the identified image based on the license plate recognition technique.

A person having ordinary skill in the art will understand that the abovementioned exemplar scenario is for illustrative purpose and should not be construed to limit the scope of the disclosure.

In another embodiment, the processor 202 may determine the one or more vehicle identification parameters, based on the manual feedback received from the parking supervisor. The parking supervisor, associated with a supervisor-computing device of the one or more supervisor-computing devices 122, may be patrolling in a parking area based on a patrolling schedule. For example, the parking supervisor patrolling in the parking area associated with the parking spot at which the parking violation is detected, may receive a first notification, on the corresponding supervisor-computing device. The first notification comprises information pertaining to the detected parking violation. The information may correspond to a parking spot identifier. Thereafter, the parking supervisor may determine the one or more vehicle identification parameters of the vehicle associated with the detected parking violation based on the received first notification. Thereafter, the parking supervisor may transmit the manual feedback by utilizing the corresponding supervisor-computing device to the application server 118. The manual feedback may comprise the one or more vehicle identification parameters determined by the parking supervisor. Further, the processor 202 may utilize the received manual feedback to identify the one or more vehicle identification parameters of the vehicle associated with the detected parking violation.

A person having ordinary skill in the art will understand that the abovementioned exemplary scenario is for illustrative purpose and should not be construed to limit the scope of the disclosure.

In an embodiment, the processor 202 may be configured to generate the patrolling schedule for the one or more parking supervisors for the plurality of parking areas 104. The processor 202 may generate the patrolling schedule based on a likelihood of occurrence of the parking violation and an aggregated value associated with the plurality of parking areas 104. In an embodiment, the processor 202 may determine the likelihood of occurrence of the parking violation based on the historical parking data associated with each of the plurality of parking areas 104. Further, the processor 202 may determine the aggregated value based on the historical parking data and generated revenue associated with each of the plurality of parking areas.

For the generation of the patrolling schedule, the processor 202 may generate a directed graph $G=\{V, \varepsilon\}$ for the plurality of parking areas 104 with a day divided into T time zones. Further, $V$ may represent a plurality of nodes in the directed graph G, such that $V = V_{(0)} \cup V_{(1)} \cup V_{(2)} \cup \ldots \cup V_{(N)}$ and $V_{(i)} = \{v_{(i,1)}, \ldots, v_{(i,T)}\}$ for all $i \in \{0, \ldots, N\}$ and a count of nodes in the plurality of nodes is N. Further, each node in the plurality of nodes N corresponds to a parking area in the plurality of parking areas 104. Further, a node $v_{(i,t)} \in V$ corresponds to a parking area in the plurality of parking areas 104 at a time zone t. In an embodiment, the directed graph G may comprise an initial node $v_{(0,0)}$ that represents a start of a day. Further, $\varepsilon$ represents a set of directed edges, each connecting two nodes in the directed graph G. In an embodiment, the two nodes may be connected by a directed edge $e=(v_{(i,t)}, v_{(j,t+1)}) \in \varepsilon$, only if there exists a travel path between the parking areas associated with the two nodes. In an embodiment, the processor 202 may be configured to determine a weight $w(v_{(i,t)}, v_{(j,t+1)})$ for each directed edge in the directed graph G based on a travel cost among the plurality of parking areas 104. For example, the processor 202 may determine a weight $w(v_{(i,t)}, v_{(j,t+1)})$ for a directed edge between a node i and a node j at time zone t and t+1 based on the travel cost between the parking area corresponding to the node i and the parking area corresponding to the node j. Further, the processor 202 may determine weight "0" for a directed edge between the node i at time zone t and the node i at time zone t+1.

After the generation of the directed graph G, the processor 202 may be configured to determine a utility factor $u(v)=P(v) \cdot s(v)$ for each node in the directed graph G. Further, the processor 202 may determine the utility factor $u(v)$ based on the likelihood of occurrence of the parking violation {i.e., $P(v)$} at each of the plurality of parking areas 104 associated with the plurality of nodes $V$ in the directed graph G. The processor 202 may further determine the utility factor $u(v)$ based on the aggregated value $s(v)$ associated with the plurality of parking areas 104. In an embodiment, the aggregated value may correspond to an increase in revenue generated from each of the plurality of parking areas 104 when a parking violation is detected and the penalty received from the one or more users for the detected parking violation.

In an embodiment, the processor 202 may determine the likelihood of occurrence of the parking violation {i.e., $P(v)$} at each of the plurality of parking areas 104 based on the historical parking data associated with each of the plurality of parking areas 104. In an embodiment, the processor 202 may be configured to determine the historical parking data based on the manual feedback received from the one or more parking supervisors (i.e., M). For example, the prediction unit 210 may determine the historical parking data for the plurality of parking areas 104 based on the manual feedback received from the one or more parking supervisors (count of the one or more supervisors is M). The processor 202 may determine the historical parking data in a C count of days, such that C=N/M. Further, the processor 202 may determine a fraction of patrol visits $P(v_{(i,t)})$ by the one or more parking supervisors M to the plurality of parking areas 104, during which the parking violation may be detected by the processor 202. Further, the prediction unit 210 may determine a count of total patrol visits by the one or more parking supervisors M at the plurality of parking areas 104 as K=NT (i.e., a sum $\Sigma_i \Sigma_t k_{v_{(i,t)}}$ of patrol visits by the one or more parking supervisors M at each of the plurality of parking areas 104). Thereafter, the processor 202 may be configured to determine the aggregated value $s(v_{(i,t)})$ for each of the plurality of the parking areas 104 at each time zone t. After the determination of the historical parking data in C days, the processor 202 may determine the utility factor $u(v)$ based on equation (1), as shown below:

$$u(v) = \left(P(v) + \sqrt{\frac{8\log K}{K_v}}\right) \cdot \left(s(v) + \sqrt{\frac{8\log K}{K_v}}\right) \forall v \in V \quad (1)$$

where, $K_v$ represents a count of visits by the one or more parking supervisors at a node v.

After the determination of the utility factor, the processor 202 may be configured to determine a cost $c_e$ of each directed edge $e=(v_{(i,t)}, v_{(j,t+1)})$, such that $c_e=w(e)-u(v)$. Thereafter, the processor 202 may utilize one or more known algorithms in the art, such as the shortest path algorithm, to generate the patrolling schedule of the one or more parking supervisors.

In an embodiment, the processor 202 may formulate a linear program problem with one or more constraints for the generation of the patrolling schedule of the one or more supervisors based on the directed graph G and the utility factor u(v) of each node.

In an exemplary implementation, the processor 202 may formulate the linear program problem for the generation of the patrolling schedule of the one or more supervisors using the following one or more constraints:

maximize $$z_{v,m} x(u,v,m): \Sigma_{v \in V} z_v \cdot u(v) - \Sigma_{u \in V} \Sigma_{v \in V} \Sigma_{m \in \{1,\ldots,M\}} x(u,v,m) \cdot w(u,v) u, v \in V, m \in \{1,\ldots,M\} \quad (2)$$

subject to $$\Sigma_{i \in \{0,1,\ldots,N\}} z_{v_{(i,t)},m} = 1 \forall m \in \{1,\ldots,M\} \forall t \in \{1,\ldots,T\} \quad (3)$$

$$z_{v_{(i,t)},m} + z_{v_{(j,t+1)},m} \leq 1 + x_{(v_{(i,t)},v_{(j,t+1)},m)} \forall i,j \in \{0,\ldots,N\} \forall m \in \{1,\ldots,M\} \forall t \in \{1,\ldots,T\} \quad (4)$$

$$x_{(v_{(i,t)},v_{(j,t+1)},m)} \leq z_{v_{(i,t)},m} \forall i,j \in \{0,\ldots,N\} \forall m \in \{1,\ldots,M\} \forall t \in \{1,\ldots,T\} \quad (5)$$

$$x_{(v_{(i,t)},v_{(j,t+1)},m)} \leq z_{v_{(j,t+1)},m} \forall i,j \in \{0,\ldots,N\} \forall m \in \{1,\ldots,M\} \forall t \in \{1,\ldots,T\} \quad (6)$$

$$x_{(v_{(i,t)},v_{(j,t+1)},m)} \leq I_{(v_{(i,t)},v_{(j,t+1)})} \forall i,j \in \{0,\ldots,N\} \forall m \in \{1,\ldots,M\} \forall t \in \{1,\ldots,T\} \quad (7)$$

$$z_{v,m} \in \{0,1\} \forall u \in v \forall m \in \{1,\ldots,M\} \quad (8)$$

$$x_{(u,v,m)} \in \{0,1\} \forall u \in v \forall m \in \{1,\ldots,M\} \quad (9)$$

where, $z_{v,m}$ represents a Boolean variable that indicates whether or not a parking supervisor m of the one or more parking supervisors M has been scheduled at node v of the plurality of nodes in the directed graph G;

$z_v$ represents a Boolean variable that indicates whether at least one parking supervisor m of the one or more parking supervisors M has been scheduled at node 12 of the plurality of nodes in the directed graph G;

$x_{(v_{(i,t)},v_{(j,t+1)},m)}$ represents a Boolean variable that indicates whether or not a parking supervisor m of the one or more parking supervisors M travels from a parking area associated with a node i at time zone t to a parking area associated with a node j at time zone t+1. Further, $x_{(v_{(i,t)},v_{(j,t+1)},m)}=1$ if and only if $z_{v_{(i,t)},m}=1$ and $z_{v_{(j,t+1)},m}=1$; and $I_{(v_{(i,t)},v_{(j,t+1)})}$ represents a Boolean variable that indicates whether two nodes, such as nodes i and j, are connected by a directed edge.

As shown above, the linear program problem is represented in equation (2), while the one or more constraints to the linear program problem are represented in equations (3)-(9). In an embodiment, the aim of the linear program problem (i.e., equation (2)) is to determine $z_{v,m}$ for all $v \in V$ and $m \in \{1, \ldots, M\}$ that maximizes the utility factor for each node v of the plurality of nodes V in the directed graph G. Equation (3) represents a constraint that one parking supervisor may be scheduled at only one parking area at a time zone t. Equation (4) represents a constraint that if a parking supervisor m is scheduled at a parking area represented by a node i at a time zone t and a parking area represented by a node j at a time zone t+1, the parking supervisor m may travel from the parking area represented by the node i at a time zone t to reach the parking area represented by the node j at the time zone t+1. Equations (5), (6), and (7) represent constraints that if a parking supervisor m travels from a node i at a time zone t to a parking area represented by a node j at a time zone t+1, the parking supervisor m must be scheduled at the parking area represented by the node i at a time zone t and the parking area represented by the node j at the time zone t+1 and there must exist a travel path between the parking areas associated with the corresponding two nodes (i.e., nodes i and j). Further, equations (8) and (9) represent constraints that $z_{v,m}$ and $x_{(u,v,m)}$ are Boolean variables.

In an embodiment, the transceiver 206 may be further configured to transmit the generated patrolling schedule to the one or more supervisor-computing devices 122, over the communication network 124. Further, the processor 202 may be configured to store the generated patrolling schedule in the database server 120.

In an embodiment, the processor 202 may be configured to update the likelihood of occurrence of the parking violation {i.e., P(v)} by using equation (10), as shown below:

$$P(v) = \frac{P(v)K_v + b}{P(v)K_v + 1} \quad (10)$$

where, b represents a Boolean variable to indicate whether a parking violation is detected by the processor 202 at node v of the plurality of nodes. For example, b=1, if a parking violation is detected, else b=0.

In an embodiment, the processor 202 may be configured to update the aggregated value {i.e., s(v)} by using equation (11), as shown below:

$$s(v) = \frac{s(v)K_v + d}{s(v)K_v + 1} \quad (11)$$

where, d represents a variable to record revenue from the detected parking violations and the determined penalty received based on the detected parking violations at node v of the plurality of nodes.

Thereafter, the processor 202 may utilize the updated likelihood of occurrence of the parking violation {i.e., P(v)} and the updated aggregated value {i.e., s(v)} to update the utility factor associated with each of the plurality of nodes in the directed graph G based on equation (1).

A person having ordinary skill in the art will understand that the abovementioned exemplary implementations are for illustrative purpose and should not be construed to limit the scope of the disclosure.

After the identification of the one or more vehicle identification parameters based on the one or more image processing techniques or the manual feedback, in an embodiment, the transceiver 206 may be configured to transmit a second notification to the user-computing device of the user associated with the vehicle with the identified one or more vehicle identification parameters. The second notification may comprise information pertaining to the detected parking violation. Further, the transceiver 206 may be configured to transmit a third notification to the agent-computing device (not shown) of the service provider of the plurality of parking areas 104. The third notification may comprise information pertaining to the one or more vehicle identification parameters of the vehicle associated with the detected parking violation.

At step 310, the penalty for the vehicle, with the identified one or more parameters, is determined. In an embodiment, the processor 202, in conjunction with the prediction unit 210, may be configured to determine the penalty for the vehicle with the identified one or more parameters. In an embodiment, the processor 202 may determine the penalty based on the adaptive penalty factor when the detected parking violation is of the first violation type. In an alternate embodiment, the processor 202 may determine the penalty based on the fixed penalty factor when the detected parking violation is of the second violation type.

In an exemplary implementation for the first violation type, the processor 202 may impose a regular charging cost to an EV type, such as the first vehicle 110A, until the parking violation is detected. The processor 202 may utilize equation (12), as shown below for the determination of the regular charging cost:

$$p_{charge}(t) = \alpha_{charge} T_1 \quad (12)$$

where, $\alpha_{charge}$ represents a regular charging cost factor for availing the charging facility, such as "C_1", at the EV spot in the one or more parking spots;

$T_1$ represents a first time interval during which no parking violation is detected by the processor 202. In an embodiment, the first time interval may correspond to a charging time when the vehicle, such as the first vehicle 110A, is the EV type; and $p_{charge}$ represents the regular charging cost imposed on the first vehicle 110A for availing the charging facility, such as "C_1", at the EV parking spot.

Further, in an instance, the processor 202 may detect a parking violation (i.e., the first violation type) by a vehicle, such as the first vehicle 110A, parked at the EV parking spot. Thereafter, the processor 202 may determine the penalty for the vehicle, such as the first vehicle 110A. The processor 202 may utilize equation (13), as shown below for the determination of the penalty:

$$p_{penalty}(t) = \alpha_{penalty}(T_2 - T_1) \quad (13)$$

where, $\alpha_{penalty}$ represents the adaptive penalty factor; $(T_2 - T_1)$ represents a second time interval for which the parking violation by a vehicle, such as the first vehicle 110A, of the EV type may be detected by the processor 202; and $p_{penalty}$ represents the penalty imposed on the vehicle, such as the first vehicle 110A, of EV type due to the detected parking violation.

Further, in an instance, after complete charging, the user, such as the first user 112A, may move the vehicle, such as the first vehicle 110A, of the EV type to a non-EV parking spot, such as the parking spot 106B. In such a case, the processor 202 may determine a regular parking cost for the first vehicle 110A for a duration the vehicle remains parked at the parking spot 106B. The processor 202 may utilize equation (14), as shown below for the determination of the regular parking cost:

$$p_{regular} = \alpha_{reg}(T_3 - T_{pc}) \quad (14)$$

where, $\alpha_{reg}$ represents a regular cost factor imposed on the vehicle for parking at the non-EV parking spot in the one or more parking spots;

$T_{pc}$ represents a time instance, such that $T_{pc} \leq T_3$, at which the user moves the corresponding vehicle from the EV parking spot. In an embodiment, the user may move the vehicle from the EV parking spot to the non-EV parking spot;

$(T_3 - T_{pc})$ represents a third time interval for which the vehicle may remain parked at the non-EV parking spot; and $p_{regular}$ represents a regular parking cost charged to the user associated with the vehicle for parking the corresponding vehicle at the non-EV parking spot.

Further, the processor 202 may determine the final parking cost for the user associated with the vehicle as a sum of $p_{charge}$, $p_{penalty}$, and $p_{regular}$.

In an exemplary implementation for the second violation type, the processor 202 may impose the penalty to a vehicle of the EV type, such as the first vehicle 110A, or a vehicle of the non-EV type, such as the second vehicle 110B, when the parking violation (i.e., the second violation type) is detected. The processor 202 may utilize equation (15), as shown below for the determination of the penalty:

$$p_{penalty} = \alpha_{fixed} T_4 \quad (15)$$

where, $\alpha_{fixed}$ represents the fixed penalty factor;

$T_4$ represents a fourth time interval for which the parking violation (i.e., the second violation type) is detected by the processor 202; and $p_{penalty}$ represents the penalty imposed on the vehicle for the detected parking violation.

Further, in an instance, the user may move the corresponding vehicle to the non-EV parking spot, such as the parking spot 106B, after the detection of the parking violation. In such a case, the processor 202 may determine a regular parking cost for the vehicle for a duration the vehicle remains parked at the non-EV parking spot. The processor 202 may utilize equation (16), as shown below for the determination of the regular parking cost:

$$p_{regular} = \alpha_{reg}(T_5 - T_{pc}) \quad (16)$$

where, $\alpha_{reg}$ represents a regular cost factor imposed on the vehicle for parking at the non-EV parking spot in the one or more parking spots;

$T_{pc}$ represents a time instance, such that $T_{pc} \leq T_5$, at which the user moves the vehicle from the EV parking spot to the non-EV parking spot;

$(T_5 - T_{pc})$ represents a fifth time interval for which the vehicle may remain parked at the non-EV parking spot; and $p_{regular}$ represents a regular parking cost charged to the user associated with the vehicle for parking at the non-EV parking spot.

Further, the processor 202 may determine the final parking cost for the user associated with the vehicle as a sum of $p_{penalty}$ and $p_{regular}$.

A person having ordinary skill in the art will understand that the abovementioned exemplary scenarios are for illustrative purpose and should not be construed to limit the scope of the disclosure.

In an embodiment, the prediction unit 210, in conjunction with the processor 202, may be further configured to update the adaptive penalty factor periodically. The prediction unit 210 may update the adaptive penalty factor based on at least the expected revenue and the historical parking data associated with the plurality of parking areas 104. Further, the processor 202 may determine the penalty for the vehicle with the identified one or more parameters based on a current value of the adaptive penalty factor. Prior to the determination of the current value of the adaptive penalty factor, the prediction unit 210 may be configured to further determine the historical parking data.

For further determination of the historical parking data, the processor 202 may select a set of initial values for the adaptive penalty factor. For example, the processor 202 may select the set of initial values, such as $\{x_1, x_2, x_3, \ldots, x_S\}$, for the adaptive penalty factor. Thereafter, the processor 202 may be configured to determine the penalty for the detected parking violation (i.e., the first violation type) by the one or more vehicles 110 based on the set of initial values for the adaptive penalty factor, such that the processor 202 may utilize an initial value of the adaptive penalty factor $x_i$ from the set of initial values for the adaptive penalty factor for $K_i$ days. Thus, total number of days K, for which the prediction unit 210 may further determine the historical parking data, may be represented as $K=\Sigma_i K_i$.

Further, the processor 202 may determine the generated revenue $R_i$ in $K_i$ days based on the initial value of the adaptive penalty factor $x_i$. Further, the processor 202 may be configured to determine a fraction of days (or time) $P_i$ from $K_i$ days during which the initial value of the adaptive penalty factor $x_i$ may be accepted by the one or more users associated with the vehicle, such as the first vehicle 110A, of the EV type.

In an exemplary implementation, for a first S days, the processor 202 may use the initial value of the adaptive penalty factor $x_i$ on a $i^{th}$ day to determine the penalty for detected parking violations (i.e., the first violation type). The processor 202 may utilize equation (17), (18), and (19), as shown below, to update the values of $P_i$, $R_i$, and $K_i$ for the $i^{th}$ day.

$$P_i = ((P_i \cdot K_i) + a)/(K_i + 1) \quad (17)$$

$$R_i = ((R_i \cdot K_i) + r)/(K_i + 1) \quad (18)$$

$$K_i = ((P_i \cdot K_i) + a)/(K_i + 1) \quad (19)$$

where, a represents a Boolean variable to record whether a user accepts the initial value of the adaptive penalty factor $x_i$ and parks the corresponding vehicle of the EV type in a parking area of the plurality of parking areas 104. For example, a=1, if the user accepts the initial value of the adaptive penalty factor $x_i$, else a=0; and r represents a variable to record the generated revenue from the user who accepted the initial value of the adaptive penalty factor $x_i$.

Further, the determined values of $P_i$, $R_i$, and $K_i$ for over S days (i.e., S=K) may correspond to the historical parking data further determined by the prediction unit 210.

A person having ordinary skill in the art will understand that the abovementioned exemplary implementation is for illustrative purpose and should not be construed to limit the scope of the disclosure.

After the determination of the historical parking data, the prediction unit 210 may be configured to periodically update the adaptive penalty factor. In an embodiment, the prediction unit 210 may select the current value (i.e., the updated value) of the adaptive penalty factor $x_i^*$, such that $$i^* = \arg\max_i R_i + \sqrt{\frac{8 \log K}{K_i}}.$$

Further, the processor 202 may be configured to update the values of $P_i$, $R_i$, and $K_i$ based on the current value of the adaptive penalty factor by utilizing equations (17), (18), and (19), respectively.

Further, the prediction unit 210 may determine the expected revenue E[R] based on the historical parking data by utilizing equation (20), as shown below:

$$E[R] = \int_{Z=0}^{\infty} \int_{T_1=0}^{\infty} \int_{T_P=0}^{\infty} \int_{T_{appt}=0}^{\infty} p(T_P, T_1, Z) R(T_P, T_1, T_{appt}, Z) dF_Z dF_1 dF_P dF_{appt} \quad (20)$$

where, $T_P$ represents a total time for which a user parks a vehicle at a parking spot;

$T_1$ represents the charging time during which the vehicle of EV type utilizes the charging facility, such as "C_1", of the EV parking spot in a parking area;

Z represents a maximum penalty the user may be ready to pay;

$T_{appt}$ represents a time duration for which the user may not want to move the vehicle from a parking spot to another parking spot;

$R(T_P, T_1, T_{appt}, Z)$ represents the revenue generated from the user due to a parking violation detection by the processor 202;

$p(T_P, T_1, Z)$ represents a probability that the user may accept the adaptive penalty factor to park the vehicle of the EV type;

$F_Z$ represents a normal distribution of the maximum penalty the one or more users 112 may be ready to pay. $F_Z$ may be determined based on the determined historical parking data;

$F_1$ represents a normal distribution of the charging time during which the one or more vehicles that are of electrical type utilizes the charging facility, such as "C_1", of one or more EV parking spots in a parking area. $F_1$ may be further determined based on the historical parking data;

$F_P$ represents a normal distribution of the total time the one or more users park the one or more vehicles of EV type at the one or more EV parking spots. $F_P$ may be further determined based on the determined historical parking data; and $F_{appt}$ represents a normal distribution of time duration for which the user may not want to move the vehicle from a parking spot to another parking spot.

Further, the processor 202 may utilize equation (21), for the determination of the probability $p(T_P, T_1, Z)$ that the user may accept the adaptive penalty factor to park the vehicle of the EV type, as shown below:

$$p(T_P, T_1, Z) = \begin{cases} 1, & T_P \leq T_1 + p_{penalty}^{-1}(Z) \\ F_{appt}(T_1 + p_{penalty}^{-1}(Z)) + F_1(T_1 + p_{penalty}^{-1}(Z)), & T_P > T_1 + p_{penalty}^{-1}(Z) \end{cases} \quad (21)$$

where, $p_{penalty}^{-1}(Z)$ represents the maximum penalty the user may be ready to pay.

Further, the processor 202 may utilize equation (22), for the determination of the revenue generated $R(T_P, T_1, T_{appt},$ Z) from the user due to a parking violation detection by the processor 202, as shown below:

$$R(T_P, T_1, T_{appt}, Z) = \begin{cases} P_{charge}(T_P), & T_1 \geq T_P \\ P_{charge}(T_1) + P_{penalty}(T_{PC} - T_1) + p_{regular}, & (T_P - T_{PC})T_p > T_1 \leq T_{PC} \leq T_p \end{cases} \quad (22)$$

In an embodiment, the prediction unit 210 may further update the adaptive penalty factor based on one or more parameters. In an embodiment, the one or more parameters may comprise a wait time threshold and/or a grace time period. In an embodiment, the prediction unit 210 may update the adaptive penalty factor based on the wait time threshold such that an average waiting time for availability of the EV parking spot may not exceed the wait time threshold. Further, prediction unit 210 may update the adaptive penalty factor based on the grace time period such that penalty imposed during the grace time period ($T_G$) does not exceed a pre-specified penalty threshold ($P_G$). In an embodiment, the pre-specified penalty threshold ($P_G$) may be specified by the service provider.

At step 312, the determined penalty is transmitted to the user-computing device of the user associated with the identified one or more vehicle identification parameters. In an embodiment, the transceiver 206, in conjunction with the processor 202, may be configured to transmit the determined penalty to the user-computing device, such as the first user-computing device 116A or the second user-computing device 116B, of the user, such as the first user 112A or the second user 112B, associated with the vehicle, such as the first vehicle 110A or the second vehicle 110B, with the identified one or more vehicle identification parameters. In an embodiment, the transceiver 206 may transmit the final parking cost to the user-computing device of the user associated with the vehicle with the identified one or more vehicle identification parameters. The final parking cost transmitted to the user may include regular parking cost and/or the determined penalty, payable by the user.

In an exemplary implementation, the transceiver 206 may transmit the final parking cost to the first user 112A associated with the first vehicle 110A with the identified one or more vehicle identification parameters. Further, when the first user 112A leaves the parking area, such as the first parking area 106, the first user 112A may have to pay the determined final parking cost at an exit gate of the first parking area 106. Further, the final parking cost paid by the first user 112A may comprise the determined penalty for the detected parking violation. The determined penalty may be associated with the first violation type or the second violation type.

In another exemplary implementation, the transceiver 206 may transmit the final parking cost to the first user 112A associated with the first vehicle 110A with the identified one or more vehicle identification parameters. Further, the transceiver 206 may transmit the final parking cost incurred by the first user 112A to a parking supervisor patrolling in the second parking area 108. When the first user 112A leaves the second parking area 108, the first user 112A may have to pay the determined final parking cost to the parking supervisor patrolling the second parking area 108. The final parking cost paid by the first user 112A may comprise the determined penalty for the detected parking violation in the second parking area 108. The determined penalty may be associated with the first violation type or the second violation type. Control passes to end step 314.

A person having ordinary skill in the art will understand that the abovementioned exemplary scenario is for illustrative purpose and should not be construed to limit the scope of the disclosure.

Figure 4A:
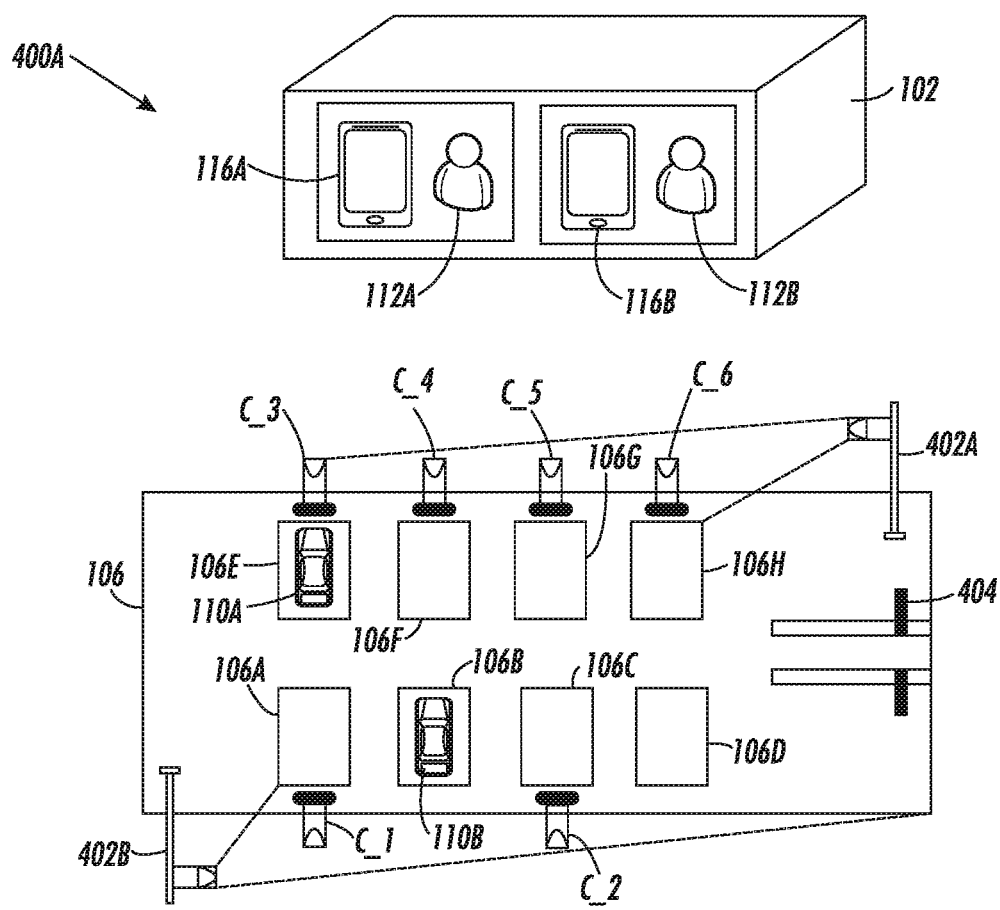
FIGS. 4A, 4B, and 4C are block diagrams that illustrate exemplary scenarios of a method for managing parking violations by vehicles in parking areas in real-time, in accordance with at least one embodiment.
Figure 4B:
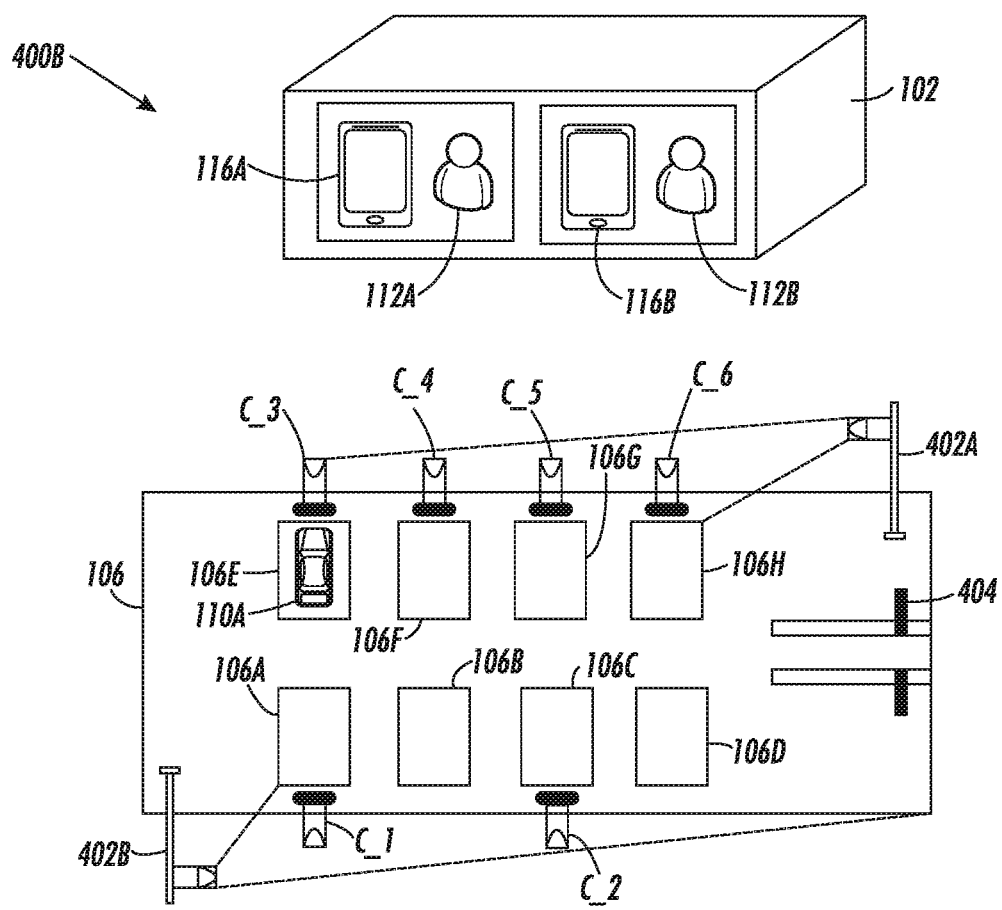
Figure 4C:
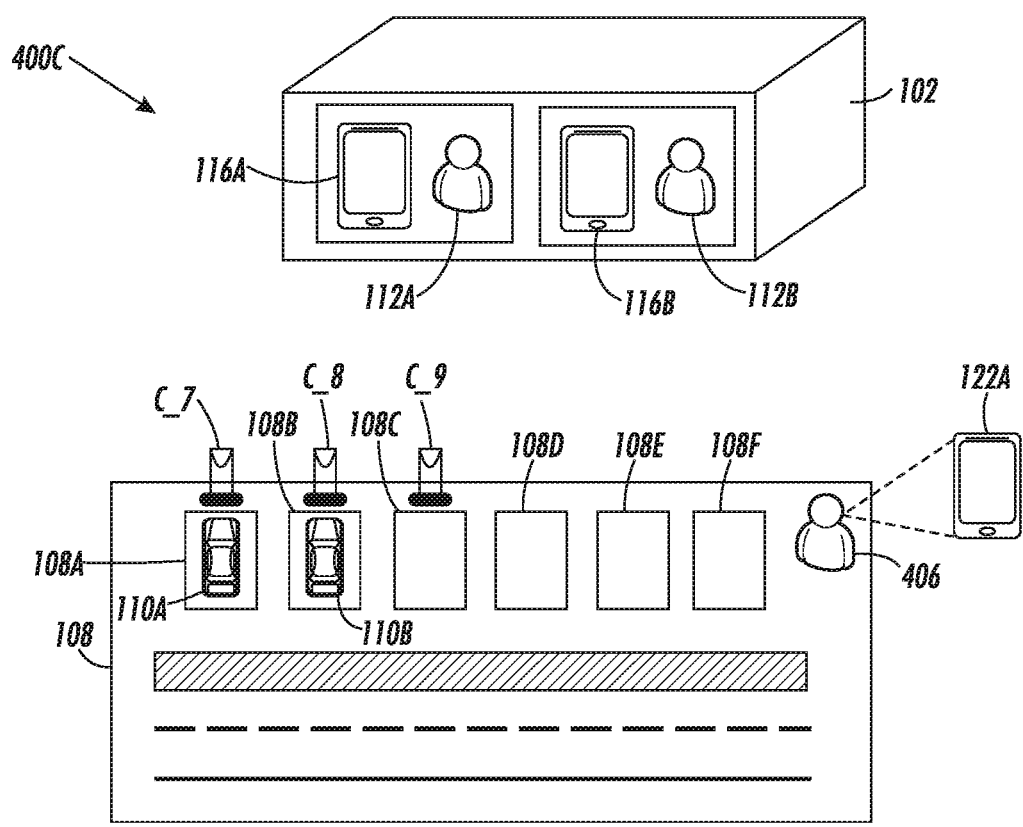

FIGS. 4A, 4B, and 4C are block diagrams that illustrate exemplary scenarios for managing parking violations by vehicles in parking areas in real-time. FIGS. 4A-4C are described in conjunction with FIGS. 1-3.

With reference to FIG. 4A, there is shown an exemplary scenario 400A illustrating a method for managing parking violations by vehicles in parking areas in real-time. The exemplary scenario 400A comprises the premise 102. Further, the premise 102 is associated with the first parking area 106. The first parking area 106 corresponds to the off-street parking area. Further, the first parking area 106 comprises the one or more parking spots, such as the parking spots 106A to 106H. Further, the parking spots 106A, 106C, 106E, 106F, 106G, and 106H correspond to the EV parking spot and the parking spots 106B and 106D correspond to the non-EV parking spot. Further, each of the EV parking spots has a charging facility, such as "C_1" to "C_6." The first parking area 106 is further installed with the one or more surveillance cameras, such as cameras 402A and 402B. Each of the one or more parking spots, such as the parking spots 106A to 106H, may be further installed with the one or more first sensors and/or the one or more second sensors. Further, the one or more vehicles 110 may enter the first parking area 106 through an entry/exit door 404.

In an embodiment, the first user 112A, visiting the premise 102, may utilize the first parking area 106 to park the first vehicle 110A (associated with the first vehicle-computing device 114A). Further, the first vehicle 110A may be of the EV type. The first user 112A may be associated with the first user-computing device 116A. The first user 112A may park the first vehicle 110A at a parking spot 106E (i.e., the EV parking spot). Thereafter, the first user 112A may leave the first vehicle 110A in the first parking area 106 to visit the premise 102. The one or more first sensors at the parking spot 106E may transmit the parking information pertaining to the parking spot 106E to the application server 118. The parking information may comprise the occupancy status (i.e., "occupied") of the parking spot 106E. Further, the first user 112A may utilize the charging facility, such as "C_3," available at the parking spot 106E to charge the first vehicle 110A. Thus, the one or more second sensors at the parking spot 106E may further transmit the parking information pertaining to the parking spot 106E to the application server 118. The parking information may further comprise the power drawn status of the parking spot 106E. The power drawn status changes from "0" to "1" when the first user 112A plugs in to a charging port available at the charging facility, such as "C_3."

Similarly, a second user 112B, visiting the premise 102, may utilize the first parking area 106 to park the second vehicle 110B (associated with the second vehicle-computing device 114B). Further, the second vehicle 110B may be of the non-EV type. The second user 112B may be associated with the second user-computing device 116B. The second user 112B may park the second vehicle 110B at a parking spot 106B (i.e., the non-EV parking spot). Thereafter, the second user 112B may leave the second vehicle 110B in the first parking area 106 to visit the premise 102. The one or more first sensors at the parking spot 106B may transmit the parking information pertaining to the parking spot 106B to the application server 118. The parking information may comprise the occupancy status (i.e., "occupied") of the parking spot 106B.

The one or more surveillance cameras, such as the cameras 402A and 402B, may transmit one or more images of the first parking area 106 to the application server 118. Based on the parking information and the one or more images received, the application server 118 may determine whether the set of pre-defined rules is met by the one or more vehicles, such as the first vehicle 110A and the second vehicle 110B. In an embodiment, the application server 118 may determine that the set of pre-defined rules is met by the first vehicle 110A and the second vehicle 110B.

When the first vehicle 110A is completely charged, the first vehicle-computing device 114A may transmit a second notification to the first user-computing device 116A. Further, the power drawn status of the parking spot 106E, in the parking information, changes from "1" to "0." Thereafter, the application server 118 may check the occupancy status of the parking spot 106E. In an embodiment, if the occupancy status of the parking spot 106E continues to remain "occupied" for more than the violation time threshold, such as "5 minutes," a parking violation may be detected by the application server 118. In this scenario, the parking violation may correspond to the first violation type. In another embodiment, after the reception of the second notification, the first user 112A may move the first vehicle 110A to an available non-EV parking spot, such as the parking spot 106D. In such a case, no parking violation may be detected by the application server 118.

After the detection of the parking violation by the first vehicle 110A at the parking spot 106E, the application server 118 may utilize the one or more image processing techniques to process the one or more images received from the one or more surveillance cameras, such as the cameras 402A and 402B, for the identification of the one or more vehicle identification parameters, such as a license plate number, of the first vehicle 110A. After the identification of the one or more vehicle identification parameters, the application server 118 may determine the penalty for the first vehicle 110A. The application server 118 may utilize the current value of the adaptive penalty factor to determine the penalty. Further, the application server 118 may store the determined penalty of the first vehicle 110A in the database server 120. In an embodiment, the penalty increases as the duration of the parking violation increases. Further, the application server 118 may be configured to transmit the determined penalty to the first user-computing device 116A of the first user 112A. Thereafter, when the first user 112A, after the completion of the one or more activities in the premise 102, drives the first vehicle 110A out of the entry/exit door 404 of the first parking area 106 the determined penalty must be paid by the first user 112A.

In an embodiment, the application server 118 may further utilize the penalty received from the first user 112A and the detected parking violation instance to update the historical parking data stored in the database server 120. Further, the updated historical parking data may be utilized to update the adaptive penalty factor and the patrolling schedule of the one or more parking supervisors.

A person having ordinary skill in the art will understand that the abovementioned exemplary scenario 400A is for illustrative purpose and should not be construed to limit the scope of the disclosure.

With reference to FIG. 4B, there is shown an exemplary scenario 400B illustrating a method for managing parking violations by vehicles in parking areas in real-time. The exemplary scenario 400B comprises the premise 102. Further, the premise 102 is associated with the first parking area 106. The first parking area 106 corresponds to the off-street parking area. Further, the first parking area 106 comprises the one or more parking spots, such as the parking spots 106A to 106H. Further, the parking spots 106A, 106C, 106E, 106F, 106G, and 106H correspond to the EV parking spot and the parking spots 106B and 106D correspond to the non-EV parking spot. Further, each of the EV parking spots has the charging facility, such as "C_1" to "C_6." The first parking area 106 is further installed with the one or more surveillance cameras, such as cameras 402A and 402B. The one or more first sensors and/or the one or more second sensors may be further installed at each of the one or more parking spots, such as the parking spots 106A to 106H. Further, the one or more vehicles 110 may enter the first parking area 106 through the entry/exit door 404.

In an embodiment, a second user 112B, visiting the premise 102, may utilize the first parking area 106 to park the second vehicle 110B (associated with the second vehicle-computing device 114B). Further, the second vehicle 110B may be of the non-EV type. The second user 112B may be associated with the second user-computing device 116B. The second user 112B may park the second vehicle 110B at a parking spot 106C (i.e., the EV parking spot). Thereafter, the second user 112B may leave the second vehicle 110B in the first parking area 106 to visit the premise 102. The one or more first sensors at the parking spot 106C may transmit the parking information pertaining to the parking spot 106C to the application server 118. The parking information may comprise the occupancy status (i.e., "occupied") of the parking spot 106C. Further, the one or more second sensors at the parking spot 106C may further transmit the parking information pertaining to the parking spot 106C to the application server 118. The parking information may further comprise the power drawn status of the parking spot 106C. The power drawn status may remain "0" beyond the violation time threshold, such as "5 minutes," as the second vehicle 110B is of the non-EV type.

Based on the received parking information, the application server 118 may determine whether the set of pre-defined rules is met by the second vehicle 110B. In an embodiment, the application server 118 may determine that the set of pre-defined rules is breached by the second vehicle 110B. Thus, a parking violation of the second type may be detected by the application server 118.

After the detection of the parking violation by the second vehicle 110B at the parking spot 106C, the application server 118 may utilize the one or more image processing techniques to process the one or more images received from the one or more surveillance cameras, such as the cameras 402A and 402B, for the identification of the one or more vehicle identification parameters, such as a license plate number, of the second vehicle 110B. After the identification of the one or more vehicle identification parameters, the application server 118 may determine the penalty for the second vehicle 110B. The application server 118 may utilize the fixed penalty factor to determine the penalty. Further, the application server 118 may store the determined penalty of the second vehicle 110B in the database server 120. In an embodiment, the penalty increases as the duration of the parking violation increases. Further, the application server 118 may be configured to transmit the determined penalty to the second user-computing device 116B of the second user 112B. Thereafter, when the second user 112B, after the completion of the one or more activities in the premise 102, drives the second vehicle 110B out of the entry/exit door 404 of the first parking area 106, the determined penalty must be payable by the second user 112B.

In an embodiment, the application server 118 may further utilize the penalty received from the first user 112B and the detected parking violation instance to update the historical parking data stored in the database server 120. Further, the updated historical parking data may be utilized to update the adaptive penalty factor and the patrolling schedule of the one or more parking supervisors.

A person having ordinary skill in the art will understand that the abovementioned exemplary scenario 440B is for illustrative purpose and should not be construed to limit the scope of the disclosure.

With reference to FIG. 4C, there is shown an exemplary scenario 400C illustrating a method for managing parking violations by vehicles in parking areas in real-time. The exemplary scenario 400C comprises the premise 102. Further, the premise 102 is associated with the second parking area 108. The second parking area 108 corresponds to an on-street parking area. Further, the second parking area 108 comprises the one or more parking spots, such as the parking spots 108A to 108F. Further, the parking spots 108A, 108B, and 108C correspond to the EV parking spot and the parking spots 108D, 108E, and 108F correspond to the non-EV parking spot. Further, the EV parking spots has the charging facility, such as "C_7" to "C_9." Further, a parking supervisor 502, associated with the supervisor-computing device 122A, may be patrolling the second parking area 108 based on the generated patrolling schedule.

In an embodiment, a first user 112A, visiting the premise 102, may utilize the second parking area 108 to park the first vehicle 110A (associated with the first vehicle-computing device 114A). Further, the first vehicle 110A may be of the EV type. The first user 112A may be associated with the first user-computing device 116A. The first user 112A may park the first vehicle 110A at the parking spot 108A (i.e., the EV parking spot). Thereafter, the first user 112A may leave the first vehicle 110A in the second parking area 108 to visit the premise 102.

Similarly, a second user 112B, visiting the premise 102, may utilize the second parking area 108 to park the second vehicle 110B (associated with the second vehicle-computing device 114B). Further, the second vehicle 110B may be of the non-EV type. The second user 112B may be associated with the second user-computing device 116B. The second user 112B may park the second vehicle 110B at the parking spot 108B (i.e., the EV parking spot). Thereafter, the second user 112B may leave the second vehicle 110B in the second parking area 108 to visit the premise 102.

The parking supervisor 502 may utilize the supervisor-computing device 122A to transmit the parking information pertaining to the occupied parking spots, such as the parking spots 108A and 108B, in the second parking area 108. The parking information may comprise the occupancy status and/or the power drawn status of the occupied parking spots, such as the parking spots 108A and 108B.

Based on the parking information received from the supervisor-computing device 122A, the application server 118 may determine whether the set of pre-defined rules is met by the one or more vehicles, such as the first vehicle 110A and the second vehicle 110B. In an embodiment, the application server 118 may determine that the set of pre-defined rules is breached by the second vehicle 110B. Thus, a parking violation of second type may be detected by the application server 118.

After the detection of the parking violation by the second vehicle 110B at the parking spot 108B, the application server 118 may transmit the first notification to the supervisor-computing device 122A. Thereafter, the parking supervisor 502 may provide the manual feedback to the application server 118 by utilizing the supervisor-computing device 122A. The manual feedback comprises the one or more vehicle identification parameters, such as a license plate number, of the second vehicle 110B.

After the identification of the one or more vehicle identification parameters, the application server 118 may determine the penalty for the second vehicle 110B. The application server 118 may utilize the fixed penalty factor to determine the penalty. Further, the application server 118 may store the determined penalty of the second vehicle 110B in the database server 120. In an embodiment, the penalty increases as the duration of the parking violation increases. Further, the application server 118 may be configured to transmit the determined penalty to the second user-computing device 116B of the second user 112B. Thereafter, when the second user 112B, after the completion of the one or more activities in the premise 102, drives the second vehicle 110B out of the second parking area 108, the parking supervisor 502 may collect the determined penalty from the second user 112B.

In an embodiment, when the first vehicle is completely charged, the first vehicle-computing device 114A may transmit the second notification to the first user-computing device 116A. In an instance, the first user 112A may not move the first vehicle 110A from the parking spot 108A even after the violation time threshold, such as "5 minutes," is over. Further, based on the parking information received from the supervisor-computing device 122A, a parking violation by the first vehicle 110A may be detected by the application server 118. The detected parking violation corresponds to the first violation type. In another instance, the first user 112A may move the first vehicle 110A to an available non-EV parking spot, such as the parking spot 108D, after the reception of the second notification. In such a case, based on the parking information received from the supervisor-computing device 122A, no parking violation may be detected by the application server 118.

After the detection of the parking violation by the first vehicle 110A at the parking spot 108A, the application server 118 may transmit the first notification to the supervisor-computing device 122A to the identify the one or more vehicle identification parameters, such as a license plate number, of the first vehicle 110A. Thereafter, the parking supervisor 502 may provide the manual feedback to the application server 118 by utilizing the supervisor-computing device 122A. The manual feedback comprises the one or more vehicle identification parameters, such as a license plate number, of the first vehicle 110A.

After the identification of the one or more vehicle identification parameters, the application server 118 may determine the penalty for the first vehicle 110A. The application server 118 may utilize the current value of the adaptive penalty factor to determine the penalty. Further, the application server 118 may store the determined penalty of the first vehicle 110A in the database server 120. In an embodiment, the penalty increases as the duration of the parking violation increases. Further, the application server 118 may be configured to transmit the determined penalty to the first user-computing device 116A of the first user 112A. Thereafter, when the first user 112A, after the completion of the one or more activities in the premise 102, drives the first vehicle 110A out of the second parking area 108, the parking supervisor 502 may collect the determined penalty from the first user 112A.

In an embodiment, the application server 118 may further utilize the penalty received from the first user 112A and the detected parking violation instance to update the historical parking data stored in the database server 120. Further, the updated historical parking data may be utilized to update the adaptive penalty factor and the patrolling schedule of the one or more parking supervisors.

A person having ordinary skill in the art will understand that the abovementioned exemplary scenario 400A is for illustrative purpose and should not be construed to limit the scope of the disclosure.

The disclosed embodiments encompass numerous advantages. The disclosure provides a method and a system for managing parking violations by vehicles in parking areas in real-time. The disclosed method and system automatically detects a parking violation in a parking area and the vehicle associated with the parking violation based on parking information received from one or more sensors installed at the parking area and/or one or more parking supervisors patrolling in the parking area. Further, the method and system utilizes a likelihood of occurrence of the parking violation and an aggregated value associated with a plurality of parking areas. Further, the likelihood of occurrence of the parking violation and an aggregated value is determined based on the historical parking data. The disclosed method and system automatically determines penalty for the detected parking violation based on an adaptive penalty factor or a fixed penalty factor. The disclosed method and system further updates the adaptive penalty factor to maintain a trade-off between one or more users availing the parking facility and revenue generated from the detected parking violations. The disclosed method and system provides a robust and dynamic means manage the parking violations in real-time. The disclosed method and system may be utilized by any service provider of a parking facility comprising both EV parking spots and non-EV parking spots.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for managing parking violations by vehicles in parking areas in real-time have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for managing parking violations by vehicles in parking areas in real-time, the method comprising:

receiving, by one or more transceivers, parking information from one or more sensors installed at each of one or more parking spots in a plurality of parking areas at a specific time, wherein the parking information comprises one or more images of the one or more parking spots and a power draw status of occupied parking spots of the one or more parking spots, wherein the parking spot of the one or more parking spots corresponds to an EV parking spot or a non-EV parking spot, wherein the EV parking spot is associated with the EV type and the non-EV parking spot is associated with the non-EV type and the EV type;

detecting, by one or more processors, an occupancy status of each of the one or more parking spots based on the one or more images;

determining, by one or more processors, a parking violation by a vehicle at a parking spot of the one or more parking spots in a parking area of the plurality of parking areas based on the occupancy status and power draw status, wherein the parking violation is associated with a first violation type or a second violation type, wherein the first violation type being determined in response to the power draw status of the parking spot changing from drawing power to not drawing power and the occupancy status of the spot is occupied for a predetermined time, and the second violation type being determined in response to the power draw status of the parking spot being not drawing power and the occupancy status of the spot changing from unoccupied to occupied and remains occupied for more than a violation time threshold;

identifying, by the one or more processors, one or more vehicle identification parameters of the vehicle associated with the determined parking violation;

selecting a penalty factor from among an adaptive penalty factor and a fixed penalty factor based on the type of the parking violation;

wherein the adaptive penalty factor is selected when the parking violation is of the first violation type and the fixed penalty factor is selected when the determined parking violation is of the second violation type, and wherein the adaptive penalty factor is periodically updated based on at least an expected revenue and historical parking data of the plurality of parking areas;

determining, by the one or more processors, a penalty for the identified vehicle based on the selected penalty factor;

transmitting, by the one or more transceivers, the determined penalty to a user-computing device of a user associated with the identified vehicle, wherein the user is imposed with the determined penalty; and scheduling a patrol by one or more parking supervisors for the plurality of parking areas, based on at least a likelihood of occurrence of the parking violation and an aggregated value associated with the plurality of parking areas, wherein the likelihood of occurrence of the parking violation is determined based on the historical parking data of each of the plurality of parking areas.

2. The method of claim 1, wherein detecting the occupancy status of the one or more parking spots is based on one or more image processing techniques.

3. The method of claim 1, wherein the identification of the one or more vehicle identification parameters of the vehicle is further based on a manual feedback received from a parking supervisor, of the one or more parking supervisors, associated with a supervisor-computing device, when the parking violation by the vehicle is detected.

4. The method of claim 1, wherein the aggregated value is determined based on the historical parking data and generated revenue of each of the plurality parking areas.

5. The method of claim 1, wherein the scheduling of the patrol by one or more parking supervisors is based on a travel cost among the plurality of parking areas.

6. A system for managing parking violations by vehicles in parking areas in real-time, the system comprising:

one or more processors configured to:

receive parking information from one or more sensors installed at each of one or more parking spots in a plurality of parking areas by utilizing one or more transceivers at a specific time, wherein the parking information comprises one or more images of the one or more parking spots and a power draw status of occupied parking spots of the one or more parking spots, wherein the parking spot of the one or more parking spots corresponds to an EV parking spot or a non-EV parking spot, wherein the EV parking spot is associated with the EV type and the non-EV parking spot is associated with the non-EV type and the EV type;

detect an occupancy status of each of the one or more parking spots based on the one or more images;

determine, a parking violation by a vehicle at a parking spot of the one or more parking spots in a parking area of the plurality of parking areas based on the occupancy status and power draw status, wherein the parking violation is associated with a first violation type or a second violation type, wherein the first violation type being determined in response to the power draw status of the parking spot changing from drawing power to not drawing power and the occupancy status of the spot is occupied for a predetermined time, and the second violation type being determined in response to the power draw status of the parking spot being not drawing power and the occupancy status of the spot changing from unoccupied to occupied and remains occupied for more than a violation time threshold;

identify one or more vehicle identification parameters of the vehicle associated with the determined parking violation;

select a penalty factor from among an adaptive penalty factor and a fixed penalty factor based on the type of the parking violation, wherein the adaptive penalty factor is selected when the parking violation is of the first violation type and the fixed penalty factor is selected when the determined parking violation is of the second violation type, and
wherein the adaptive penalty factor is periodically updated based on at least an expected revenue and historical parking data of the plurality of parking areas;
determine a penalty for the identified vehicle based on the selected penalty factor;
transmit the determined penalty to a user-computing device of a user associated with the identified vehicle by utilizing the one or more transceivers, wherein the user is imposed with the determined penalty; and
schedule a patrol by one or more parking supervisors for the plurality of parking areas, based on at least a likelihood of occurrence of the parking violation and an aggregated value associated with the plurality of parking areas, wherein the likelihood of occurrence of the parking violation is determined based on the historical parking data of each of the plurality of parking areas.

7. The system of claim 6, wherein the identification of the one or more vehicle identification parameters of the vehicle is further based on a manual feedback received from a parking supervisor, of the one or more parking supervisors, associated with a supervisor-computing device, when the parking violation by the vehicle is detected.

8. The system of claim 6, wherein the aggregated value is determined based on the historical parking data and generated revenue of each of the plurality of parking areas.

9. The system of claim 6, wherein the scheduling of the patrol by one or more parking supervisors is based on a travel cost among the plurality of parking areas.

10. A computer program product for use with a computer, the computer program product comprising a non-transitory computer readable medium, wherein the non-transitory computer readable medium stores a computer program code for managing parking violations by vehicles in parking areas in real-time, wherein the computer program code is executable by one or more processors to:
receive parking information from one or more sensors installed at each of one or more parking spots in a plurality of parking areas by utilizing one or more transceivers at a specific time, wherein the parking information comprises one or more images of the one or more parking spots and a power draw status of occupied parking spots of the one or more parking spots, wherein the parking spot of the one or more parking spots corresponds to an EV parking spot or a non-EV parking spot, wherein the EV parking spot is associated with the EV type and the non-EV parking spot is associated with the non-EV type and the EV type;
detect an occupancy status of each of the one or more parking spots based on the one or more images;
determine, a parking violation by a vehicle at a parking spot of the one or more parking spots in a parking area of the plurality of parking areas based on the occupancy status and power draw status, wherein the parking violation is associated with a first violation type or a second violation type,
wherein the first violation type being determined in response to the power draw status of the parking spot changing from drawing power to not drawing power and the occupancy status of the spot is occupied for a predetermined time, and
the second violation type being determined in response to the power draw status of the parking spot being not drawing power and the occupancy status of the spot changing from unoccupied to occupied and remains occupied for more than a violation time threshold;
identify one or more vehicle identification parameters of the vehicle associated with the determined parking violation;
select a penalty factor from among an adaptive penalty factor and a fixed penalty factor based on the type of the parking violation,
wherein the adaptive penalty factor is selected when the parking violation is of the first violation type and the fixed penalty factor is selected when the determined parking violation is of the second violation type, and
wherein the adaptive penalty factor is periodically updated based on at least an expected revenue and historical parking data of the plurality of parking areas;
determine a penalty for the identified vehicle based on the selected penalty factor;
transmit the determined penalty to a user-computing device of a user associated with the identified vehicle by utilizing the one or more transceivers, wherein the user is imposed with the determined penalty; and
schedule a patrol by one or more parking supervisors for the plurality of parking areas, based on at least a likelihood of occurrence of the parking violation and an aggregated value associated with the plurality of parking areas, wherein the likelihood of occurrence of the parking violation is determined based on the historical parking data of each of the plurality of parking areas.

* * * * *